United States Patent
Hirai et al.

(10) Patent No.: US 11,859,835 B2
(45) Date of Patent: Jan. 2, 2024

(54) HUMIDITY CONTROL APPARATUS WITH DUAL HEAT EXCHANGERS AND BYPASS PASSAGE

(71) Applicant: DAIKIN INDUSTRIES, LTD., Osaka (JP)

(72) Inventors: Kousuke Hirai, Osaka (JP); Gakuto Sakai, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1068 days.

(21) Appl. No.: 16/304,822

(22) PCT Filed: May 31, 2017

(86) PCT No.: PCT/JP2017/020295
§ 371 (c)(1),
(2) Date: Nov. 27, 2018

(87) PCT Pub. No.: WO2018/003388
PCT Pub. Date: Jan. 4, 2018

(65) Prior Publication Data
US 2020/0232665 A1    Jul. 23, 2020

(30) Foreign Application Priority Data

Jun. 27, 2016    (JP) .................................. 2016-126668

(51) Int. Cl.
*F24F 11/00*    (2018.01)
*F24F 11/72*    (2018.01)
(Continued)

(52) U.S. Cl.
CPC .......... *F24F 11/0008* (2013.01); *F24F 11/72* (2018.01); *F24F 13/20* (2013.01); *F24F 13/22* (2013.01);
(Continued)

(58) Field of Classification Search
CPC .... F24F 11/0008; F24F 3/1411; F24F 3/1429; F24F 3/147; F24F 3/14; F24F 11/02;
(Continued)

(56) References Cited

U.S. PATENT DOCUMENTS

2010/0243749 A1* 9/2010 Matsui ..................... F24F 11/30
236/44 A
2010/0252642 A1* 10/2010 Matsui .................. F24F 3/1411
236/44 A
(Continued)

FOREIGN PATENT DOCUMENTS

JP    2009-109118 A    5/2009
JP    2010-281502 A    12/2010
(Continued)

OTHER PUBLICATIONS

International Search Report for PCT/JP2017/020295 dated Aug. 1, 2017.

*Primary Examiner* — Tavia Sullens
*Assistant Examiner* — Khaled Ahmed Ali Al Samiri
(74) *Attorney, Agent, or Firm* — BIRCH, STEWART, KOLASCH & BIRCH, LLP

(57) ABSTRACT

A controlling unit controls a refrigerant circuit and a flow path switching mechanism to perform a first humidity control operation or a second humidity control operation. In the first humidity control operation, a bypass passage is closed, and outside air is supplied into a room through one of first and second adsorption heat exchangers, and room air is exhausted to outside through the other of the first and second adsorption heat exchangers. In the second humidity control operation, the bypass passage is opened, and the outside air is supplied into the room through one of the first and second adsorption heat exchangers and the bypass passage, and
(Continued)

room air is exhausted to outside through the other of the first and second adsorption heat exchangers.

5 Claims, 20 Drawing Sheets

(51) Int. Cl.
    *F24F 13/20*     (2006.01)
    *F24F 13/22*     (2006.01)
    *F24F 13/30*     (2006.01)

(52) U.S. Cl.
    CPC ......... *F24F 13/30* (2013.01); *F24F 2013/202* (2013.01)

(58) Field of Classification Search
    CPC . F24F 2013/202; F25B 2700/02; F25B 17/02; F25B 37/00
    See application file for complete search history.

(56) References Cited

U.S. PATENT DOCUMENTS

| | | | | |
|---|---|---|---|---|
| 2014/0007604 | A1* | 1/2014 | Sakai | F24F 11/0008 62/238.7 |
| 2014/0166765 | A1* | 6/2014 | Takahashi | F24F 11/0008 236/44 A |
| 2014/0230475 | A1* | 8/2014 | Matsui | F24F 11/0008 62/186 |

FOREIGN PATENT DOCUMENTS

| | | | |
|---|---|---|---|
| JP | 2011-12882 | A | 1/2011 |
| JP | 4946800 | B2 | 6/2012 |
| JP | 2013-36731 | A | 2/2013 |
| KR | 20120028415 | A * | 3/2012 |

* cited by examiner

FIG. 5

| | DAMPER (83,84) | DAMPER (41,44,46,47) | DAMPER (42,43,45,48) | FIRST ADSORPTION HEAT EXCHANGER (51) | SECOND ADSORPTION HEAT EXCHANGER (52) |
|---|---|---|---|---|---|
| FIRST PATH | CLOSED | CLOSED | OPENED | OUTSIDE AIR (OA) PASSED | ROOM AIR (RA) PASSED |
| SECOND PATH | CLOSED | OPENED | CLOSED | ROOM AIR (RA) PASSED | OUTSIDE AIR (OA) PASSED |
| THIRD PATH | OPENED | CLOSED | OPENED | OUTSIDE AIR (OA) PASSED | ROOM AIR (RA) PASSED |
| FOURTH PATH | OPENED | OPENED | CLOSED | ROOM AIR (RA) PASSED | OUTSIDE AIR (OA) PASSED |

FIG. 7

|  | FOUR-WAY SWITCHING VALVE (54) | FIRST ADSORPTION HEAT EXCHANGER (51) | SECOND ADSORPTION HEAT EXCHANGER (52) |
|---|---|---|---|
| FIRST REFRIGERATION CYCLE OPERATION | FIRST STATE | CONDENSER | EVAPORATOR |
| SECOND REFRIGERATION CYCLE OPERATION | SECOND STATE | EVAPORATOR | CONDENSER |

FIG. 12

| | OPERATION | PATH | REFRIGERATION CYCLE OPERATION | TYPE OF OPERATION |
|---|---|---|---|---|
| NORMAL HUMIDITY CONTROL | FIRST OPERATION | FIRST PATH | FIRST REFRIGERATION CYCLE OPERATION | NORMAL HUMIDIFICATION OPERATION |
| | | | SECOND REFRIGERATION CYCLE OPERATION | NORMAL DEHUMIDIFICATION OPERATION |
| | SECOND OPERATION | SECOND PATH | SECOND REFRIGERATION CYCLE OPERATION | NORMAL HUMIDIFICATION OPERATION |
| | | | FIRST REFRIGERATION CYCLE OPERATION | NORMAL DEHUMIDIFICATION OPERATION |
| BYPASS HUMIDITY CONTROL | FIRST OPERATION | THIRD PATH | FIRST REFRIGERATION CYCLE OPERATION | BYPASS HUMIDIFICATION OPERATION |
| | | | SECOND REFRIGERATION CYCLE OPERATION | BYPASS DEHUMIDIFICATION OPERATION |
| | SECOND OPERATION | FOURTH PATH | SECOND REFRIGERATION CYCLE OPERATION | BYPASS HUMIDIFICATION OPERATION |
| | | | FIRST REFRIGERATION CYCLE OPERATION | BYPASS DEHUMIDIFICATION OPERATION |

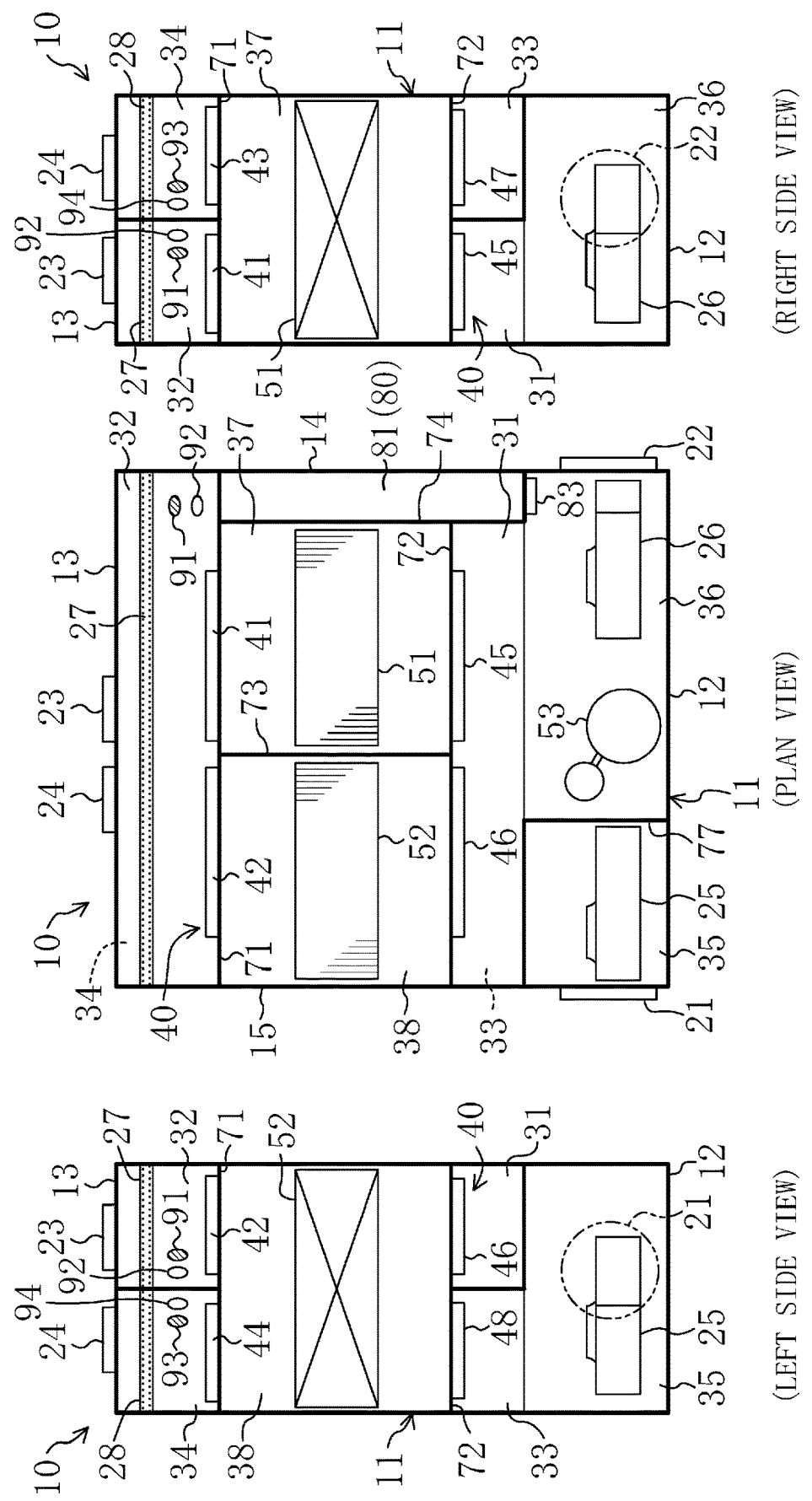

FIG. 16

| | DAMPER (83) | DAMPER (41,44,46,47) | DAMPER (42,43,45,48) | FIRST ADSORPTION HEAT EXCHANGER (51) | SECOND ADSORPTION HEAT EXCHANGER (52) |
|---|---|---|---|---|---|
| FIRST PATH | CLOSED | CLOSED | OPENED | OUTSIDE AIR (OA) PASSED | ROOM AIR (RA) PASSED |
| SECOND PATH | CLOSED | OPENED | CLOSED | ROOM AIR (RA) PASSED | OUTSIDE AIR (OA) PASSED |
| THIRD PATH | OPENED | CLOSED | OPENED | OUTSIDE AIR (OA) PASSED | ROOM AIR (RA) PASSED |
| FOURTH PATH | OPENED | OPENED | CLOSED | ROOM AIR (RA) PASSED | OUTSIDE AIR (OA) PASSED |

HUMIDITY CONTROL APPARATUS WITH DUAL HEAT EXCHANGERS AND BYPASS PASSAGE

TECHNICAL FIELD

The present disclosure relates to a humidity control device.

BACKGROUND ART

A humidity control device for controlling humidity in a room (humidity adjustment) has been known. For example, Patent Document 1 discloses a humidity control device that includes a refrigerant circuit having a compressor and first and second adsorption heat exchangers, and that controls the humidity of the air by using the first and second adsorption heat exchangers. In this humidity control device, a first operation in which the first adsorption heat exchanger functions as an evaporator and the second adsorption heat exchanger functions as a condenser, and a second operation in which the first adsorption heat exchanger functions as a condenser and the second adsorption heat exchanger functions as an evaporator are alternately performed. In a dehumidification operation, outside air that has passed through the adsorption heat exchanger serving as the evaporator is dehumidified, and supplied into the room, and room air that has passed through the adsorption heat exchanger serving as the condenser is humidified, and exhausted to the outside. In a humidification operation, outside air that has passed through the adsorption heat exchanger serving as the condenser is humidified, and supplied into the room, and room air that has passed through the adsorption heat exchanger serving as the evaporator is dehumidified, and exhausted to the outside.

CITATION LIST

Patent Document

PATENT DOCUMENT 1: Japanese Unexamined Patent Publication No. 2013-36731

SUMMARY OF THE INVENTION

Technical Problem

The humidity control device disclosed in Patent Document 1 has, in the humidity control operation (dehumidification operation/humidification operation), humidity control capacity, and an adjustment width (width of adjustable range) of which depends on an adjustment width of operating capacity of the compressor. Specifically, the adjustment width of the humidity control capacity tends to increase with the increase in the adjustment width of the operating capacity of the compressor. However, since the broadening of the adjustment width of the operating capacity of the compressor is limited, it has been difficult to broaden the adjustment width of the humidity control capacity in the humidity control operation.

It is therefore an object of the present disclosure to provide a humidity control device capable of broadening the adjustment width of the humidity control capacity.

Solution to the Problem

A first aspect of the disclosure is directed to a humidity control device including: a casing (11) provided with a first humidity control chamber (37), a second humidity control chamber (38), and a bypass passage (80); a refrigerant circuit (50) including a compressor (53), and a first adsorption heat exchanger (51) and a second adsorption heat exchanger (52) which are respectively provided in the first and second humidity control chambers (37, 38), the refrigerant circuit (50) being capable of switching each of the first and second adsorption heat exchangers (51, 52) to a condenser or an evaporator; a flow path switching mechanism (40) which switches an air flow passage in the casing (11); and a controlling unit (95) which controls the refrigerant circuit (50) and the flow path switching mechanism (40) so as to perform a first humidity control operation or a second humidity control operation. In the first humidity control operation, the bypass passage (80) is closed, and outside air (OA) taken into the casing (11) is supplied into a room through one of the first and second adsorption heat exchangers (51, 52), and room air (RA) taken into the casing (11) is exhausted to outside through the other of the first and second adsorption heat exchangers (51, 52); and in the second humidity control operation, the bypass passage (80) is opened, and the outside air (OA) taken into the casing (11) is supplied into the room through one of the first and second adsorption heat exchangers (51, 52) and the bypass passage (80), and the room air (RA) taken into the casing (11) is exhausted to the outside through the other of the first and second adsorption heat exchangers (51, 52).

In the first aspect, the humidity control capacity in the humidity control operation depends on the operating capacity of the compressor (53) and the flow rate of air that passes through the first and second adsorption heat exchangers (51, 52) (particularly, the amount of the outside air (OA) that passes through the first and second adsorption heat exchangers (51, 52)). Specifically, the humidity control capacity of the humidity control device tends to increase with the increase in the amount of the outside air (OA) that passes through the adsorption heat exchangers (51, 52). In this example, in the second humidity control operation, the outside air (OA) is diverged into one of the first and second adsorption heat exchangers (51, 52) and the bypass passage (80). Consequently, the amount of the outside air (OA) that passes through the adsorption heat exchangers (51, 52) in the second humidity control operation is less than the amount of the outside air (OA) that passes through the adsorption heat exchangers (51, 52) in the first humidity control operation.

Thus, in the first aspect described above, switching from the first humidity control operation to the second humidity control operation makes it possible to reduce the amount of the outside air (OA) that passes through the adsorption heat exchangers (51, 52), thereby shifting the adjustable range of the humidity control capacity of the humidity control device to the negative side (lower side). Conversely, switching from the second humidity control operation to the first humidity control operation makes it possible to increase the amount of the outside air (OA) that passes through the adsorption heat exchangers (51, 52), thereby shifting the adjustable range of the humidity control capacity of the humidity control device to the positive side (higher side). This can return the adjustable range of the humidity control capacity of the humidity control device from the adjustable range in the second humidity control operation to the adjustable range in the first humidity control operation.

A second aspect of the present disclosure is an embodiment of the first aspect. In the second aspect, the bypass passage (80) includes a first bypass passage (81) and a second bypass passage (82), in the first humidity control operation, the first and second bypass passages (81, 82) are closed, and the outside air (OA) taken into the casing (11) is supplied into the room through one of the first and second adsorption heat exchangers (51, 52), and the room air (RA) taken into the casing (11) is exhausted to the outside through the other of the first and second adsorption heat exchangers (51, 52), and in the second humidity control operation, the first and second bypass passages (81, 82) are opened, and the outside air (OA) taken into the casing (11) is supplied into the room through one of the first and second adsorption heat exchangers (51, 52) and one of the first and second bypass passages (81, 82), and the room air (RA) taken into the casing (11) is exhausted to the outside through the other of the first and second adsorption heat exchangers (51, 52) and the other of the first and second bypass passages (81, 82).

In the second aspect described above, the humidity control capacity of the humidity control operation depends on the operating capacity of the compressor (53) and the flow rate of air that passes through the first and second adsorption heat exchangers (51, 52) (will be hereinafter referred to as the "amount of air passing through the adsorption heat exchangers (51, 52)"). Specifically, the humidity control capacity of the humidity control device tends to increase with the increase in the amount of air passing through the adsorption heat exchangers (51, 52). In this example, in the second humidity control operation, the outside air (OA) is diverged into one of the first and second adsorption heat exchangers (51, 52) and one of the first and second bypass passages (81, 82), and the room air (RA) is diverged into the other of the first and second adsorption heat exchangers (51, 52) and the other of the first and second bypass passages (81, 82). Consequently, the amount of air passing through the adsorption heat exchangers (51, 52) in the second humidity control operation is less than the amount of air passing through the adsorption heat exchangers (51, 52) in the first humidity control operation.

Thus, in the second aspect described above, switching from the first humidity control operation to the second humidity control operation makes it possible to reduce the amount of air passing through the adsorption heat exchangers (51, 52), thereby shifting the adjustable range of the humidity control capacity of the humidity control device to the negative side (lower side). Conversely, switching from the second humidity control operation to the first humidity control operation makes it possible to increase the amount of air passing through the adsorption heat exchangers (51, 52), thereby shifting the adjustable range of the humidity control capacity of the humidity control device to the positive side (higher side). This can return the adjustable range of the humidity control capacity of the humidity control device from the adjustable range in the second humidity control operation to the adjustable range in the first humidity control operation.

A third aspect in the present disclosure is an embodiment of the first or second aspect. In the third aspect, if a target operating capacity (Ctg) of the compressor (53) falls below a predetermined lower limit operating capacity (CL) while the first humidity control operation is performed, the controlling unit (95) controls the refrigerant circuit (50) and the flow path switching mechanism (40) to switch from the first humidity control operation to the second humidity control operation.

In the third aspect described above, switching the first humidity control operation to the second humidity control operation if the target operating capacity (Ctg) of the compressor (53) falls below the lower limit operating capacity (CL) in the first humidity control operation makes it possible to shift the adjustable range of the humidity control capacity of the humidity control device to the negative side in a situation where there is no allowance to adjust the humidity control capacity of the humidity control device to the negative side.

A fourth aspect of the present disclosure is an embodiment of any one of the first to third aspects. In the fourth aspect, if the target operating capacity (Ctg) of the compressor (53) exceeds a predetermined upper limit operating capacity (CH) while the second humidity control operation is performed, the controlling unit (95) controls the refrigerant circuit (50) and the flow path switching mechanism (40) to switch from the second humidity control operation to the first humidity control operation.

In the fourth aspect described above, switching the second humidity control operation to the first humidity control operation if the target operating capacity (Ctg) of the compressor (53) exceeds the upper limit operating capacity (CH) in the second humidity control operation makes it possible to shift the adjustable range of the humidity control capacity of the humidity control device to the positive side in a situation where there is no allowance to adjust the humidity control capacity of the humidity control device to the positive side.

A fifth aspect of the disclosure is an embodiment of the third aspect. In the fifth aspect, if the target operating capacity (Ctg) of the compressor (53) exceeds the predetermined upper limit operating capacity (CH) while the second humidity control operation is performed, the controlling unit (95) controls the refrigerant circuit (50) and the flow path switching mechanism (40) to switch from the second humidity control operation to the first humidity control operation, and the lower limit operating capacity (CL) and the upper limit operating capacity (CH) are set so that a first humidity control capacity corresponding to an operating capacity of the compressor (53) being the lower limit operating capacity (CL) in the first humidity control operation is lower than a second humidity control capacity corresponding to an operating capacity of the compressor (53) being the upper limit operating capacity (CH).

In the fifth aspect described above, it is possible to prevent the second humidity control operation, which has just switched from the first humidity control operation, from returning to the first humidity control operation due to the operating capacity of the compressor (53) exceeding the upper limit operating capacity (CH). It is also possible to prevent the first humidity control operation, which has just switched from the second humidity control operation, from returning to the second humidity control operation due to the operating capacity of the compressor (53) falling below the lower limit operating capacity (CL).

A sixth aspect of the present disclosure is an embodiment of any one of the first to fifth aspects. In the sixth aspect, if a predetermined anti-condensation condition for preventing condensation in at least one of the first and second humidity control chambers (37, 38) and the bypass passage (80) is satisfied while the second humidity control operation is performed, the controlling unit (95) controls the refrigerant circuit (50) and the flow path switching mechanism (40) so that the second humidity control operation is finished.

In the sixth aspect described above, it is possible to finish the second humidity control operation if the anti-condensation condition is satisfied in the second humidity control operation.

Advantages of the Invention

According to the first to fourth aspects of the present disclosure, switching between the first humidity control operation and the second humidity control operation makes it possible to shift the adjustable range of the humidity control capacity of the humidity control device. This can further broaden the adjustment width (width of adjustable range) of the humidity control capacity of the humidity control device than when only the first humidity control operation is performed.

According to the fifth aspect of the present disclosure, it is possible to prevent frequent switching between the first humidity control operation and the second humidity control operation (i.e., hunting).

According to the sixth aspect of the disclosure, it is possible to finish the second humidity control operation if the anti-condensation condition is satisfied in the second humidity control operation. Consequently, it is possible to prevent condensation in at least one of the first and second humidity control chambers (37, 38) and the first and second bypass passages (81, 82).

BRIEF DESCRIPTION OF THE DRAWINGS

FIG. 5 is a table illustrating correspondence among air paths, the opening and closing of dampers, and the type of air passing through adsorption heat exchangers in the first embodiment.

FIG. 7 is a table illustrating correspondence between states of a four-way switching valve and states of the adsorption heat exchangers.

FIG. 12 is a table illustrating correspondence among the operations in the humidity control, the air paths, the refrigeration cycle operations of a refrigerant circuit, and the types of operation.

FIG. 15 is a schematic diagram illustrating a general configuration of a humidity control device of a second embodiment.

FIG. 16 is a table illustrating correspondence among air paths, the opening and closing of dampers, and the type of air passing through the adsorption heat exchangers in the second embodiment.

DESCRIPTION OF EMBODIMENTS

Figure 1:
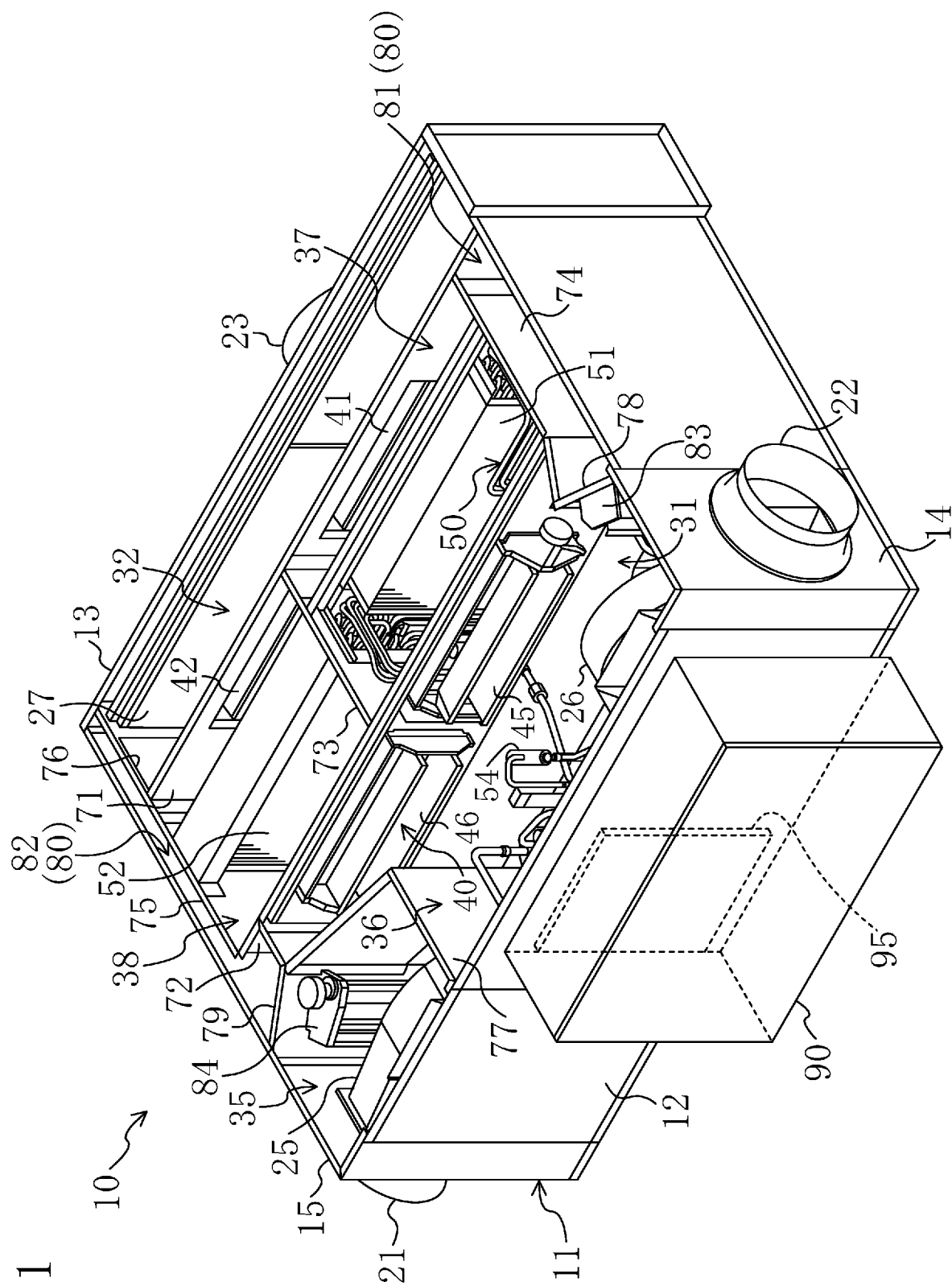
FIG. 1 is a perspective view illustrating a humidity control device of a first embodiment as viewed from the front, from which a top plate of a casing is omitted.

Embodiments will be described in detail below with reference to the accompanying drawings. It is to be noted that like reference characters designate identical or corresponding components in drawings, and description of components designated by like reference characters will not be repeated.

(Humidity Control Device)

FIGS. 1 to 4 illustrate a configuration example of a humidity control device (10) according to an embodiment. The humidity control device (10) controls the humidity in the room and ventilates the room. The humidity control device (10) is configured to control the humidity of sucked outside air (OA), and supply the air to a room as supply air (SA). The humidity control device (10) is also configured to control the humidity of sucked room air (RA), and exhaust the air to the outside as exhaust air (EA). The humidity control device (10) includes a casing (11), a refrigerant circuit (50), a flow path switching mechanism (40), and a controller (95).

The casing (11) is provided with first and second humidity control chambers (37, 38) and a bypass passage (80) that allows the air to bypass the first humidity control chamber (37) or the second humidity control chamber (38). In this example, the bypass passage (80) includes a first bypass passage (81) and a second bypass passage (82). The refrigerant circuit (50) includes a compressor (53), and first and second adsorption heat exchangers (51, 52) respectively provided in the first and second humidity control chambers (37, 38). The refrigerant circuit (50) is configured to be able to switch each of the first and second adsorption heat exchangers (51, 52) to a condenser or an evaporator. The flow path switching mechanism (40) is configured to perform switching between the air flow passages in the casing (11).

As illustrated in FIG. 1 to FIG. 4, the refrigerant circuit (50) is housed in the casing (11) of the humidity control device (10). The refrigerant circuit (50) includes the first adsorption heat exchanger (51), the second adsorption heat exchanger (52), the compressor (53), a four-way switching valve (54), and an electric expansion valve (55). The refrigerant circuit (50) will be described later. Unless otherwise specified, "above," "below," "left," "right," "front," "rear," "frontward," and "rearward" used in the following description are directions when the humidity control device (10) is viewed from the front.

<Casing>

The casing (11) is formed in a rectangular parallelepiped shape which is slightly flat and relatively short. Of the casing (11), a portion that forms a side surface on the left forward side in FIG. 1 (i.e., a front surface) is a front panel (12), and a portion that forms a side surface on the right rearward side in FIG. 1 (i.e., the rear surface) is a rear panel (13). Further, of the casing (11), a portion that forms a side surface on the right forward side in FIG. 1 is a first side panel (14), and a portion that forms a side surface on the left rearward side in FIG. 1 is a second side panel (15).

An outside air suction port (24), a room air suction port (23), an air supply port (22), and an air exhaust port (21) are formed through the casing (11). The outside air suction port (24) and the air exhaust port (21) communicate with the outside space via respective ducts. The room air suction port (23) and the air supply port (22) communicate with the inside space via respective ducts.

The outside air suction port (24) and the room air suction port (23) are provided for the rear panel (13). The outside air suction port (24) is disposed at a lower portion of the rear panel (13). The room air suction port (23) is disposed on an upper portion of the rear panel (13). The air supply port (22) is provided for the first side panel (14). The air supply port (22) is disposed around an edge of the first side panel (14) closer to the front panel (12). The air exhaust port (21) is provided for the second side panel (15). The air exhaust port (21) is disposed around an edge of the second side panel (15) closer to the front panel (12).

An upstream partition plate (71), a downstream partition plate (72), and a central partition plate (73) are provided in the inner space of the casing (11). These partition plates (71) to (73) are all installed to stand upright on a base plate of the casing (11), and partition the inner space of the casing (11) from the base plate to top plate of the casing (11).

The upstream partition plate (71) and the downstream partition plate (72) are disposed at a predetermined interval in the front-rear direction of the casing (11) in parallel with the front panel (12) and the rear panel (13). The upstream partition plate (71) is disposed closer to the rear panel (13). The downstream partition plate (72) is disposed closer to the front panel (12). The disposition of the central partition plate (73) will be described later.

The upstream partition plate (71) has a width in the lateral direction which is shorter than the width of the casing (11) in the lateral direction. Most of a lower half of a right end portion of the upstream partition plate (71) is cut out, and an upper half thereof is connected to the first side panel (14). A gap is formed between a left end portion of the upstream partition plate (71) and the second side panel (15).

The downstream partition plate (72) has a width in the lateral direction which is shorter than the width of the upstream partition plate (71) in the lateral direction. A gap is formed between a right end portion of the downstream partition plate (72) and the first side panel (14). A gap is also formed between a left end portion of the downstream partition plate (72) and the second side panel (15).

A first partition plate (74) is disposed to cover the space between the upstream partition plate (71) and the downstream partition plate (72) from the right side. More specifically, the first partition plate (74) is disposed in parallel with the first side panel (14), and orthogonal to the upstream partition plate (71) and the downstream partition plate (72). A front end portion of the first partition plate (74) is connected to the right end portion of the downstream partition plate (72). A rear end portion of the first partition plate (74) is connected to the upstream partition plate (71).

A second partition plate (75) is disposed to cover the space between the upstream partition plate (71) and the downstream partition plate (72) from the left side. More specifically, the second partition plate (75) is disposed in parallel with the second side panel (15), and orthogonal to the upstream partition plate (71) and the downstream partition plate (72). A front end portion of the second partition plate (75) is connected to the left end portion of the downstream partition plate (72). A rear end portion of the second partition plate (75) is connected to the rear panel (13). Moreover, the left end portion of the upstream partition plate (71) is connected to the second partition plate (75).

In the casing (11), the space between the upstream partition plate (71) and the rear panel (13) is partitioned into an upper space and a lower space. The upper space is configured as an room air passage (32), and the lower space an outside air passage (34). The room air passage (32) communicates with the room air suction port (23), and the outside air passage (34) communicates with the outside air suction port (24).

Figure 2:
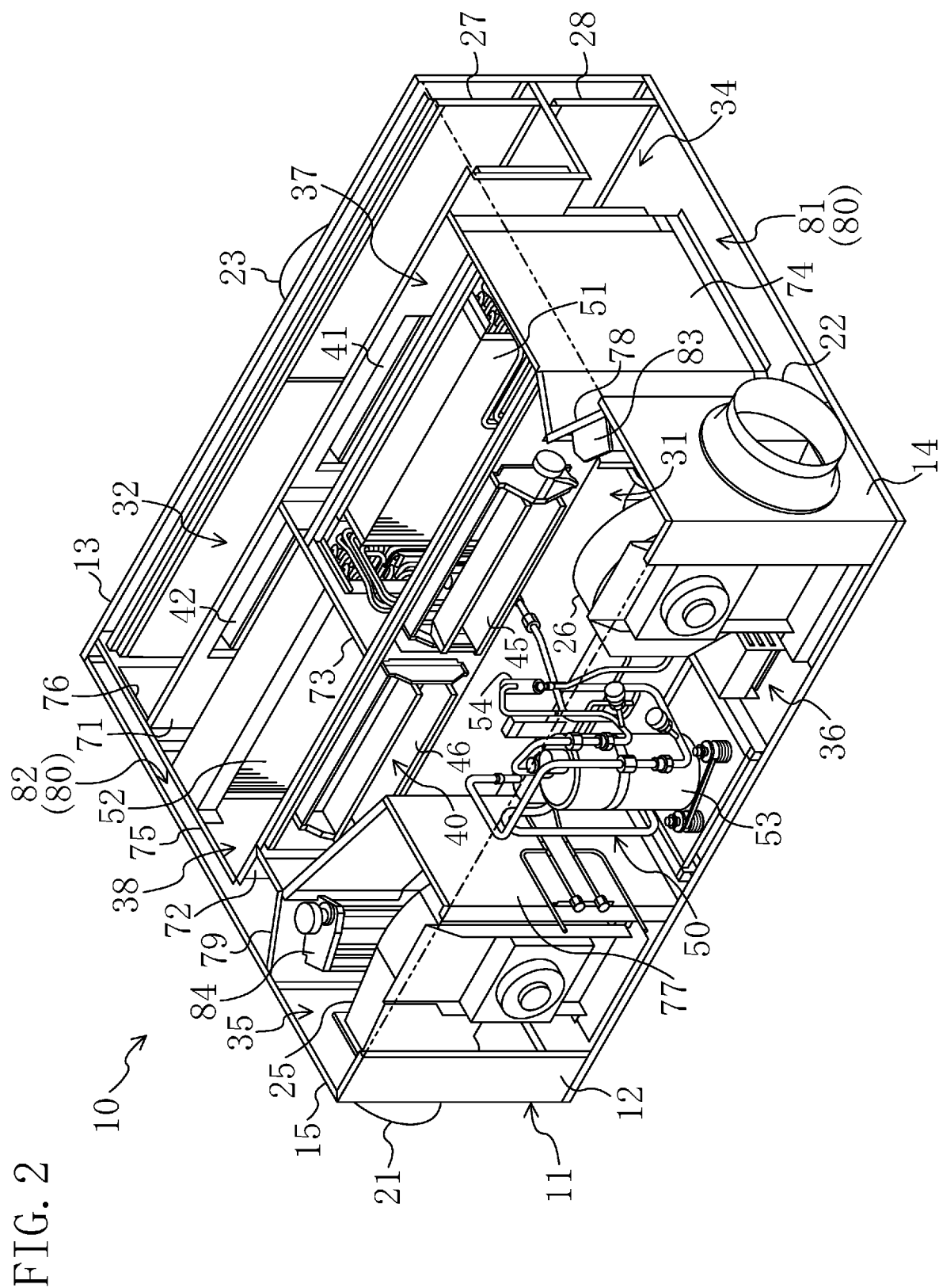
FIG. 2 is a perspective view illustrating the humidity control device of the first embodiment as viewed from the front, from which part of the casing and an electric component box are omitted.
Figure 3:
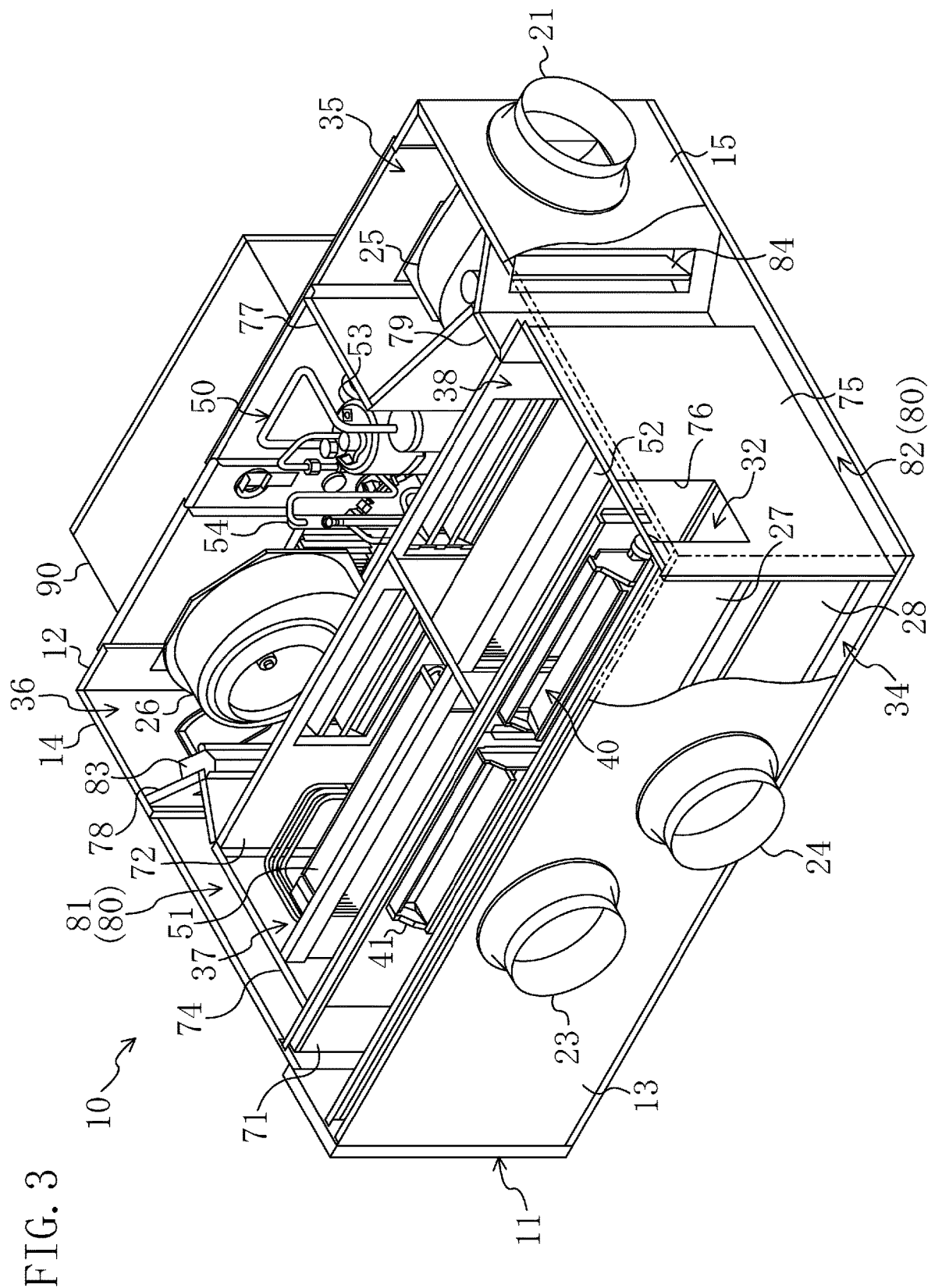
FIG. 3 is a perspective view illustrating the humidity control device of the first embodiment as viewed from the back, from which the top plate of the casing is omitted.

A room air filter (27), a room air temperature sensor (91), and a room air humidity sensor (92) are installed in the room air passage (32). The room air temperature sensor (91) detects the temperature of the room air (RA) that flows through the room air passage (32). The room air humidity sensor (92) detects the relative humidity of the room air (RA) that flows through the room air passage (32). An outside air filter (28), an outside air temperature sensor (93), and an outside air humidity sensor (94) are installed in the outside air passage (34). The outside air temperature sensor (93) detects the temperature of the outside air (OA) flowing through the outside air passage (34). The outside air humidity sensor (94) detects the relative humidity of the outside air (OA) that flows through the outside air passage (34). In FIG. 1 to FIG. 3, illustrations of the room air temperature sensor (91), the room air humidity sensor (92), the outside air temperature sensor (93), and the outside air humidity sensor (94) are omitted.

In the casing (11), the space between the upstream partition plate (71) and the downstream partition plate (72) is partitioned into a left space and a right space by the central partition plate (73). The space on the right side of the central partition plate (73) is configured as the first humidity control chamber (37), and the space on the left side of the central partition plate (73) the second humidity control chamber (38). The first adsorption heat exchanger (51) is housed in the first humidity control chamber (37), and the second adsorption heat exchanger (52) is housed in the second humidity control chamber (38). Although not illustrated, the electric expansion valve (55) of the refrigerant circuit (50) is housed in the first humidity control chamber (37). In the following explanation, the first and second humidity control chambers (37, 38) are collectively referred to as "humidity control chamber (37, 38)," and the first and second adsorption heat exchangers (51, 52) as "adsorption heat exchanger (51, 52)."

The adsorption heat exchanger (51, 52) is a cross fin-and-tube heat exchanger on a surface of which an adsorbent is supported. As the adsorbent, a material capable of adsorbing moisture in the air can be used, such as zeolite, silica gel, activated carbon, and an organic polymer material having a hydrophilic functional group. The "adsorbent" in this application also includes a material that adsorbs and absorbs vapor (i.e., a sorbent).

As a whole, the adsorption heat exchanger (51, 52) is formed in a thick rectangular plate shape or a flat rectangular parallelepiped shape. The adsorption heat exchanger (51, 52) is installed in the humidity control chamber (37, 38) in an upright state, so that the front surface and rear surface of the adsorption heat exchanger (51, 52) are in parallel with the upstream partition plate (71) and the downstream partition plate (72).

In the inner space of the casing (11), the space extending along the front surface of the downstream partition plate (72) is divided into an upper space and a lower space. The upper space is configured as a supply air passage (31), and the lower space an exhaust air passage (33).

Four openable and closable dampers (41) to (44) are provided for the upstream partition plate (71). Each of the dampers (41) to (44) is generally formed in a laterally elongated rectangular shape. More specifically, to a portion (upper portion) of the upstream partition plate (71) facing the room air passage (32), a first room air damper (41) is attached to be located on the right of the central partition plate (73) and a second room air damper (42) is attached to be located on the left of the central partition plate (73). To a portion (lower portion) of the upstream partition plate (71) facing the outside air passage (34), a first outside air damper (43) is attached to be located on the right of the central partition plate (73), and a second outside air damper (44) is attached to be located on the left of the central partition plate (73).

When the first room air damper (41) is opened or closed, the room air passage (32) and the first humidity control chamber (37) are connected or disconnected. When the second room air damper (42) is opened or closed, the room air passage (32) and the second humidity control chamber (38) are connected or disconnected. When the first outside air damper (43) is opened or closed, the outside air passage (34) and the first humidity control chamber (37) are connected or disconnected. When the second outside air damper (44) is opened or closed, the outside air passage (34) and the second humidity control chamber (38) are connected or disconnected.

Four openable and closable dampers (45) to (48) are provided for the downstream partition plate (72). Each of the dampers (45) to (48) is generally formed in a laterally elongated rectangular shape. More specifically, to a portion (upper portion) of the downstream partition plate (72) facing the supply air passage (31), a first supply air damper (45) is attached to be located on the right of the central partition plate (73), and a second supply air damper (46) is attached to be located on the left of the central partition plate (73). To a portion (lower portion) of the downstream partition plate (72) facing the exhaust air passage (33), a first exhaust air damper (47) is attached to be located on the right of the central partition plate (73), and a second exhaust air damper (48) is attached to be located on the left of the central partition plate (73).

When the first supply air damper (45) is opened or closed, the supply air passage (31) and the first humidity control chamber (37) are connected or disconnected. When the second supply air damper (46) is opened or closed, the supply air passage (31) and the second humidity control chamber (38) are connected or disconnected. When the first exhaust air damper (47) is opened or closed, the exhaust air passage (33) and the first humidity control chamber (37) are connected or disconnected. When the second exhaust air damper (48) is opened or closed, the exhaust air passage (33) and the second humidity control chamber (38) are connected or disconnected.

In the casing (11), the space defined by the supply air passage (31), the exhaust air passage (33), and the front panel (12) is partitioned by a partition plate (77) into a left space and a right space. The space on the right side of the partition plate (77) is configured as an air supply fan chamber (36), and the space on the left of the partition plate (77) an exhaust fan chamber (35).

An air supply fan (26) is housed in the air supply fan chamber (36). An exhaust fan (25) is housed in the exhaust fan chamber (35). In this example, the air supply fan (26) and the exhaust fan (25) are centrifugal multiblade fans (what are called sirocco fans). The air supply fan (26) blows the air sucked from the downstream partition plate (72) side toward the air supply port (22). The exhaust fan (25) blows the air sucked from the downstream partition plate (72) side toward the air exhaust port (21).

The compressor (53) and four-way switching valve (54) of the refrigerant circuit (50) are housed in the air supply fan chamber (36). The compressor (53) and the four-way switching valve (54) are disposed between the air supply fan (26) and the partition plate (77) in the air supply fan chamber (36).

An electric component box (90) is fitted to the front panel (12) of the casing (11). The controller (95) is housed in the electric component box (90). The controller (95) will be described later.

In the casing (11), the space between the first partition plate (74) and the first side panel (14) is configured as the first bypass passage (81), and the space between the second partition plate (75) and the second side panel (15) the second bypass passage (82). The first and second bypass passages (81, 82) allow the air (outside air (OA) and room air (RA)) to bypass the first and second humidity control chambers (37, 38). In this example, the first and second bypass passages (81, 82) are provided adjacent to the first and second humidity control chambers (37, 38), respectively.

A starting end (an end closer to the rear panel (13)) of the first bypass passage (81) communicates only with the outside air passage (34), and is blocked from the room air passage (32). The first bypass passage (81) communicates with a downstream portion of the outside air filter (28) in the outside air passage (34). A terminal end (an end closer to the front panel (12)) of the first bypass passage (81) is divided from the supply air passage (31), the exhaust air passage (33), and the air supply fan chamber (36) by a partition plate (78). A first bypass damper (83) is provided for a portion of the partition plate (78) facing the air supply fan chamber (36). The first bypass damper (83) is generally formed in a longitudinally elongated rectangular shape. When the first bypass damper (83) is opened or closed, the first bypass passage (81) and the air supply fan chamber (36) are connected or disconnected.

A starting end (an end closer to the rear panel (13)) of the second bypass passage (82) communicates only with the room air passage (32), and is blocked from the outside air passage (34). The second bypass passage (82) communicates with the downstream portion of the room air filter (27) in the room air passage (32) via a communication port (76) formed through the second partition plate (75). A terminal end (an end closer to the front panel (12)) of the second bypass passage (82) is divided from the supply air passage (31), the exhaust air passage (33), and the exhaust fan chamber (35) by a partition plate (79). A second bypass damper (84) is provided for a portion of the partition plate (79) facing the exhaust fan chamber (35). The second bypass damper (84) is generally formed in a longitudinally elongated rectangular shape. When the second bypass damper (84) is opened or closed, the second bypass passage (82) and the exhaust fan chamber (35) are connected or disconnected.

Figure 4:
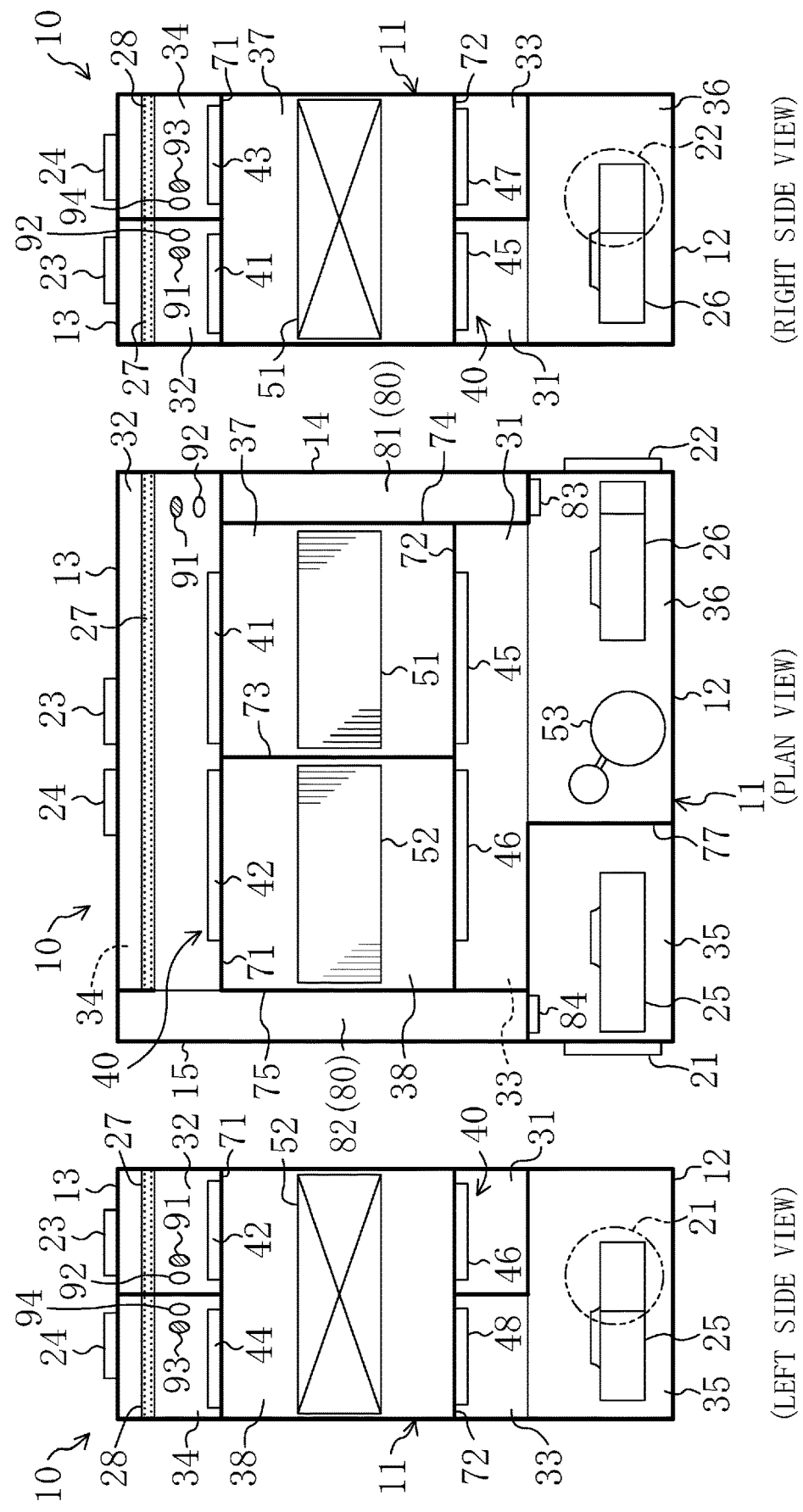
FIG. 4 is a schematic view illustrating a general configuration of the humidity control device of the first embodiment.

In the right side view and the left side view in FIG. 4, the first bypass passage (81), the second bypass passage (82), the first bypass damper (83), and the second bypass damper (84) are omitted.

<Flow Path Switching Mechanism>

In this example, the eight dampers (41) to (48) and the first and second bypass dampers (83, 84) described above constitute the flow path switching mechanism (40). The flow path switching mechanism (40) is configured to perform switching of the air flow passage in the casing (11). More specifically, the flow path switching mechanism (40) performs the switching of the air flow passage in the casing (11) among a first path (FIG. 8), a second path (FIG. 9), a third path (FIG. 10), and a fourth path (FIG. 11), by opening and closing the eight dampers (41) to (48) and the bypass dampers (83, 84). The closed dampers are hatched in FIG. 8 to FIG. 11.

<<First Path>>

To form the first path (FIG. 8), the first and second bypass dampers (83, 84) are closed; the second room air damper (42), the first outside air damper (43), the first supply air damper (45), the second exhaust air damper (48) are opened; and the first room air damper (41), the second outside air damper (44), the second supply air damper (46), and the first exhaust air damper (47) are closed. In this state, the first and second bypass passages (81, 82) are closed, and the outside air (OA) taken into the casing (11) passes through the first adsorption heat exchanger (51) to be supplied into the room, and the room air (RA) taken into the casing (11) passes through the second adsorption heat exchanger (52) to be exhausted to the outside.

<<Second Path>>

To form the second path (FIG. 9), the first and second bypass dampers (83, 84) are closed; the first room air damper (41), the second outside air damper (44), the second supply air damper (46), and the first exhaust air damper (47) are opened; and the second room air damper (42), the first outside air damper (43), the first supply air damper (45), and the second exhaust air damper (48) are closed. In this state, the first and second bypass passages (81, 82) are closed, and the outside air (OA) taken into the casing (11) passes through the second adsorption heat exchanger (52) to be supplied into the room, and the room air (RA) taken into the casing (11) passes through the first adsorption heat exchanger (51) to be exhausted to the outside.

<<Third Path>>

To form the third path (FIG. 10), the first and second bypass dampers (83, 84) are opened; the second room air damper (42), the first outside air damper (43), the first supply air damper (45), and the second exhaust air damper (48) are opened; and the first room air damper (41), the second outside air damper (44), the second supply air damper (46), and the first exhaust air damper (47) are closed. In this state, the first and second bypass passages (81, 82) are opened, and the outside air (OA) taken into the casing (11) passes through the first adsorption heat exchanger (51) and the first bypass passage (81) to be supplied into the room, and the room air (RA) taken into the casing (11) passes through the second adsorption heat exchanger (52) and the second bypass passage (82) to be exhausted to the outside.

<<Fourth Path>>

To form the fourth path (FIG. 11), the first and second bypass dampers (83, 84) are opened; the first room air damper (41), the second outside air damper (44), the second supply air damper (46), and the first exhaust air damper (47) are opened; and the second room air damper (42), the first outside air damper (43), the first supply air damper (45), and the second exhaust air damper (48) are closed. In this state, the first and second bypass passages (81, 82) are opened, and the outside air (OA) taken into the casing (11) passes through the second adsorption heat exchanger (52) and the first bypass passage (81) to be supplied into the room, and the room air (RA) taken into the casing (11) passes through the first adsorption heat exchanger (51) and the second bypath passage (82) to be exhausted to the outside.

The correspondence among the air paths (first to fourth paths), the opening and closing of the dampers (41-48, 83, and 84), the type of air (outside air (OA) and room air (RA)) that passes through the adsorption heat exchangers (51, 52) are shown in a table in FIG. 5.

<Refrigerant Circuit>

Figure 6:
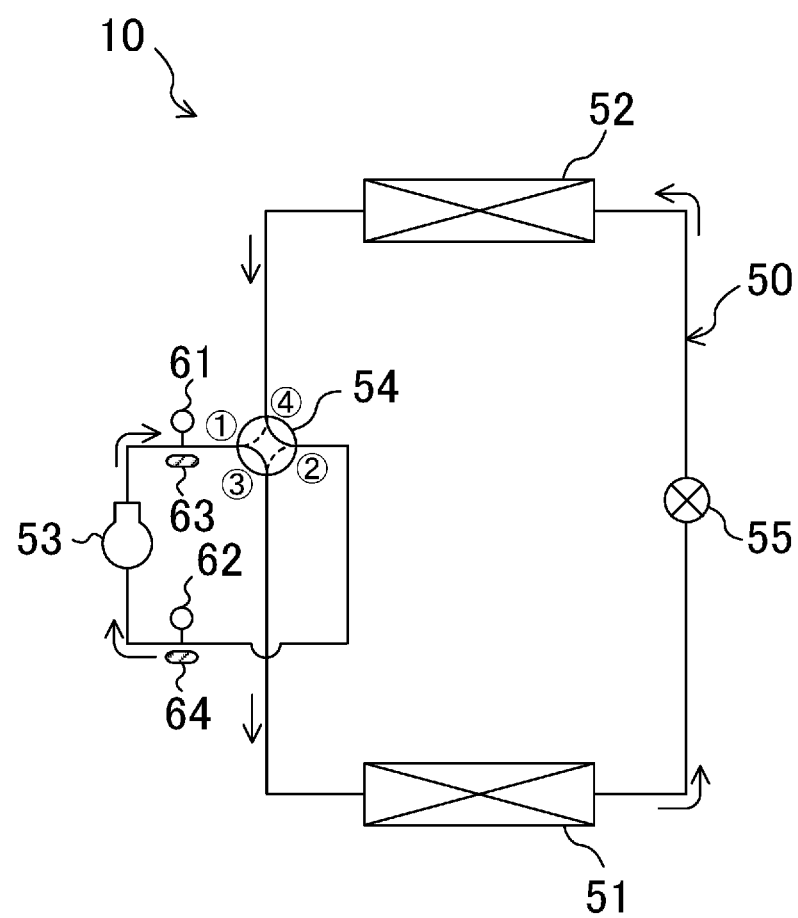
FIG. 6 shows a piping diagram illustrating a configuration of a refrigerant circuit.

FIG. 6 is a configuration example of the refrigerant circuit (50). The refrigerant circuit (50) is a closed circuit provided with the first adsorption heat exchanger (51), the second adsorption heat exchanger (52), the compressor (53), the four-way switching valve (54), and the electric expansion valve (55). The refrigerant circuit (50) circulates the refrigerant filling the circuit to perform a vapor compression refrigeration cycle. More specifically, the refrigerant circuit (50) is configured to perform a first refrigeration cycle operation and a second refrigeration cycle operation.

In the refrigerant circuit (50), a discharge pipe of the compressor (53) is connected to a first port of the four-way switching valve (54), and a suction pipe of the compressor (53) is connected to a second port of the four-way switching valve (54). In the refrigerant circuit (50), the first adsorption heat exchanger (51), the electric expansion valve (55), and the second adsorption heat exchanger (52) are disposed in this order from a third port to fourth port of the four-way switching valve (54).

The four-way switching valve (54) can be switched between a first state in which the first port is communicated with the third port, and the second port is communicated with the fourth port (a state indicated by the solid curves in FIG. 6), and a second state in which the first port is communicated with the fourth port, and the second port is communicated with the third port (a state indicated by the broken curves in FIG. 6).

The compressor (53) is configured to be able to change the operating capacity. In this example, the compressor (53) is a fully hermetic compressor in which the compression mechanism and an electric motor for driving the compression mechanism are housed in a single casing. An alternating current is supplied to an electric motor of the compressor (53) via an inverter. When the output frequency of the inverter (i.e., the operating frequency of the compressor (53)) is changed, the rotation speeds of the electric motor and the compression mechanism driven by the electric motor are changed, thereby changing the operating capacity of the compressor (53). When the rotation speed of the compression mechanism is increased, the operating capacity of the compressor (53) is increased, and when the rotation speed of the compression mechanism is reduced, the operating capacity of the compressor (53) is reduced.

<<First Refrigeration Cycle Operation>>

In the first refrigeration cycle operation, the compressor (53) is set to be driven, the four-way switching valve (54) is set to the first state (a state indicated by the solid curves in FIG. 6), and the opening degree of the electric expansion valve (55) is adjusted. Consequently, in the refrigerant circuit (50), the first adsorption heat exchanger (51) functions as a condenser and the second adsorption heat exchanger (52) functions as an evaporator. In the first adsorption heat exchanger (51) serving as the condenser, the adsorbent is heated by heat dissipated from the refrigerant, and moisture contained in the adsorbent is released in the air, thereby regenerating the adsorbent. In the second adsorption heat exchanger (52) serving as the evaporator, the refrigerant absorbs heat to cool the adsorbent, moisture contained in the air is adsorbed by the adsorbent, and heat generated by the adsorption is absorbed by the refrigerant.

<<Second Refrigeration Cycle Operation>>

In the second refrigeration cycle operation, the compressor (53) is set to be driven, the four-way switching valve (54) is set to the second state (a state indicated by the broken curves in FIG. 6), and the opening degree of the electric expansion valve (55) is adjusted. Consequently, in the refrigerant circuit (50), the first adsorption heat exchanger (51) functions as an evaporator, and the second adsorption heat exchanger (52) functions as a condenser. In the first adsorption heat exchanger (51) serving as the evaporator, the refrigerant absorbs heat to cool the adsorbent, moisture contained in the air is adsorbed by the adsorbent, and the heat generated by the adsorption is absorbed by the refrigerant. In the second adsorption heat exchanger (52) serving as the condenser, the adsorbent is heated by heat dissipated from the refrigerant, moisture contained in the adsorbent is released in the air, thereby regenerating the adsorbent.

<<Air Passing through Adsorption Heat Exchanger>>

As described above, the air passing through the adsorption heat exchanger (51) or (52) serving as the condenser receives the moisture from the adsorbent in the adsorption heat exchanger (51) or (52), thereby increasing in humidity. The air passing through the adsorption heat exchanger (51) or (52) serving as the evaporator loses its moisture as the adsorbent in the adsorption heat exchanger (51) or (52) adsorbs it, thereby decreasing in humidity.

The correspondence among the states (first and second states) of the four-way switching valve (54) and the functions of the adsorption heat exchangers (51, 52) (condenser and evaporator) are shown in a table in FIG. 7.

<<Sensors>>

The refrigerant circuit (50) is provided with various sensors, such as a discharge pressure sensor (61), a suction pressure sensor (62), a discharge temperature sensor (63), and a suction temperature sensor (64). The discharge pressure sensor (61) detects the pressure of the refrigerant (high-pressure refrigerant) discharged from the compressor (53). The suction pressure sensor (62) detects the pressure of the refrigerant (low-pressure refrigerant) sucked into the compressor (53). The discharge temperature sensor (63) detects the temperature of the refrigerant discharged from the compressor (53). The suction temperature sensor (64) detects the temperature of the refrigerant sucked into the compressor (53).

<Controller>

The controller (95) receives detection values of various sensors (for example, the room air temperature sensor (91), the room air humidity sensor (92), the outside air temperature sensor (93), the outside air humidity sensor (94), the discharge pressure sensor (61), the suction pressure sensor (62), the discharge temperature sensor (63), and the suction temperature sensor (64)). Then, the controller (95) controls the flow path switching mechanism (40) and the refrigerant circuit (50) of the humidity control device (10) based on the supplied detection values and signals. More specifically, the controller (95) controls the dampers (41-48, 83, and 84), the fans (25, 26), the compressor (53), the electric expansion valve (55), and the four-way switching valve (54).

In this example, the controller (95) controls the refrigerant circuit (50) and the flow path switching mechanism (40) so that the humidity control device (10) selectively performs normal humidity control (first humidity control) and bypass humidity control (second humidity control).

<Normal Humidity Control (First Humidity Control Operation)>

The normal humidity control is an operation for controlling the humidity in the room without using the first and second bypass passages (81, 82), and includes a normal dehumidification operation for dehumidifying the room and a normal humidification operation for humidifying the room.

In the normal humidity control, the air supply fan (26) and the exhaust fan (25) are set to be driven. Consequently, the outside air (OA) is taken into the casing (11) through the outside air suction port (24), and the room air (RA) is taken into the casing (11) through the room air suction port (23).

Moreover, in the normal humidity control, the first and second bypass passages (81, 82) are closed, and the first and second adsorption heat exchangers (51, 52) are alternately switched to the condenser or the evaporator. Then, the air flow passages in the casing (11) are switched so that the outside air (OA) taken into the casing (11) is supplied into the room through one of the first and second adsorption heat exchangers (51, 52) (specifically, one of the adsorption heat exchangers serving as the condenser or the evaporator), and the room air (RA) taken into the casing (11) is exhausted to the outside through the other one of the first and second adsorption heat exchangers (specifically, the other adsorption heat exchanger serving as the evaporator or the condenser) between the first and second adsorption heat exchangers (51, 52). More specifically, the following first operation and second operation are alternately performed every three minutes.

<<First Operation of Normal Humidity Control>>

Figure 8:
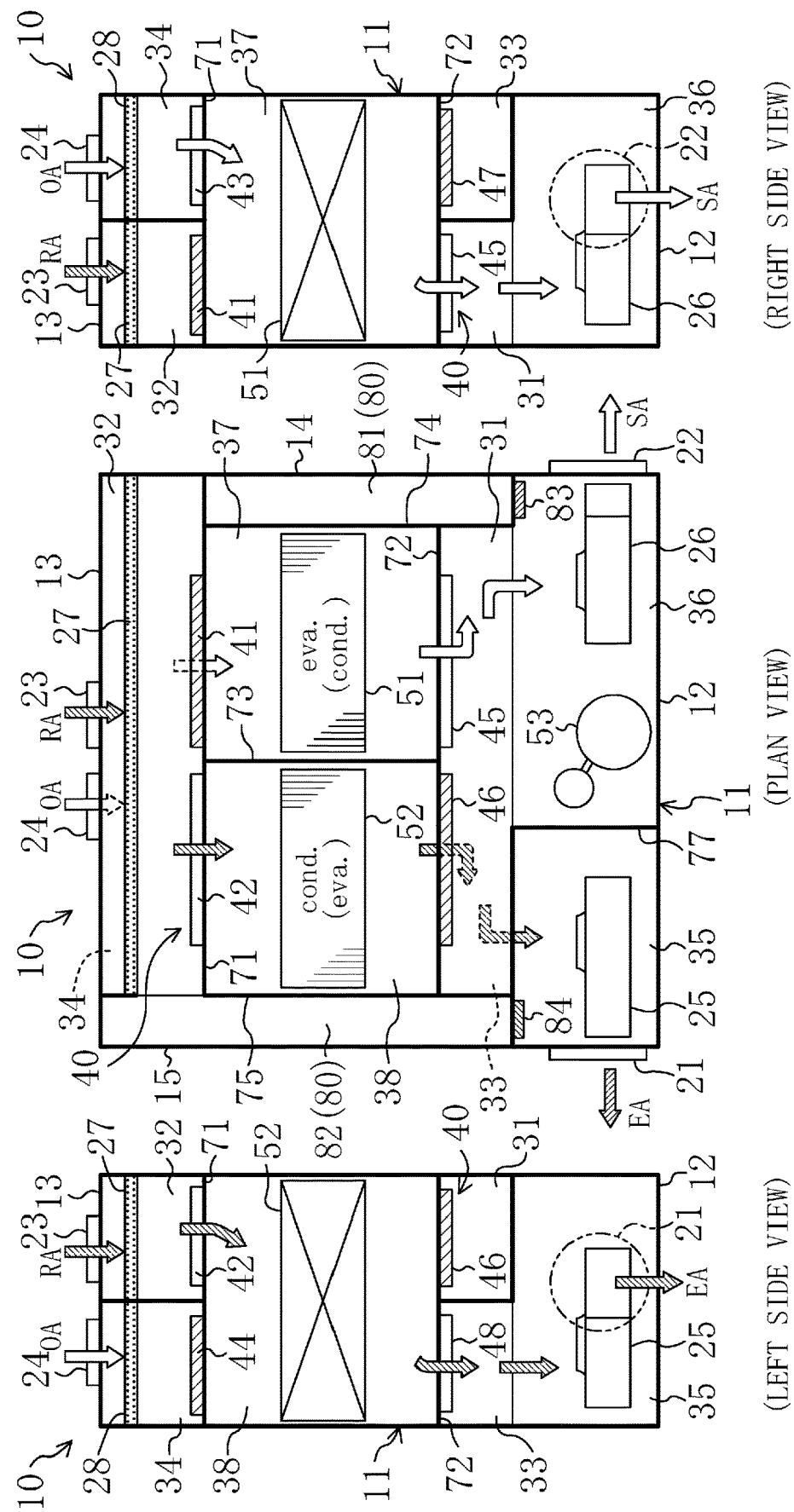
FIG. 8 is a schematic diagram illustrating a first operation of normal humidity control in the first embodiment.

As illustrated in FIG. 8, in the first operation of the normal humidity control, the air flow passage in the casing (11) is set to the first path. Moreover, a refrigeration cycle operation is performed in the refrigerant circuit (50). More specifically, the refrigerant circuit (50) performs the second refrigeration cycle operation in the normal dehumidification operation, and the refrigerant circuit (50) performs the first refrigeration cycle operation in the normal humidification operation.

The outside air (OA) that has passed through the outside air suction port (24) and taken into the outside air passage (34) flows into the first humidity control chamber (37) through the first outside air damper (43), and passes through the first adsorption heat exchanger (51) in the first humidity control chamber (37) to have its humidity controlled (dehumidified or humidified). More specifically, in the normal dehumidification operation, the outside air (OA) is dehumidified and cooled as it passes through the first adsorption heat exchanger (51) serving as the evaporator. In the normal humidification operation, the outside air (OA) is humidified and heated as it passes through the first adsorption heat exchanger (51) serving as the condenser. The air the humidity of which has been controlled by the first adsorption heat exchanger (51) passes through the first supply air damper (45), the supply air passage (31), the air supply fan chamber (36), and the air supply port (22) in this order, and is supplied into the room.

The room air (RA) that has passed through the room air suction port (23) and taken into the room air passage (32) flows into the second humidity control chamber (38) through the second room air damper (42), and passes through the second adsorption heat exchanger (52) in the second humidity control chamber (38) to have its humidity controlled (humidified or dehumidified). More specifically, in the normal dehumidification operation, the room air (RA) is humidified and heated as it passes through the second adsorption heat exchanger (52) serving as the condenser. In the normal humidification operation, the room air (RA) is dehumidified and cooled as it passes through the second adsorption heat exchanger (52) serving as the evaporator. The air the humidity of which has been controlled by the second adsorption heat exchanger (52) passes through the second exhaust air damper (48), the exhaust air passage (33), the exhaust fan chamber (35), and the air exhaust port (21) in this order, and is exhausted to the outside.

<<Second Operation of Normal Humidity Control>>

Figure 9:
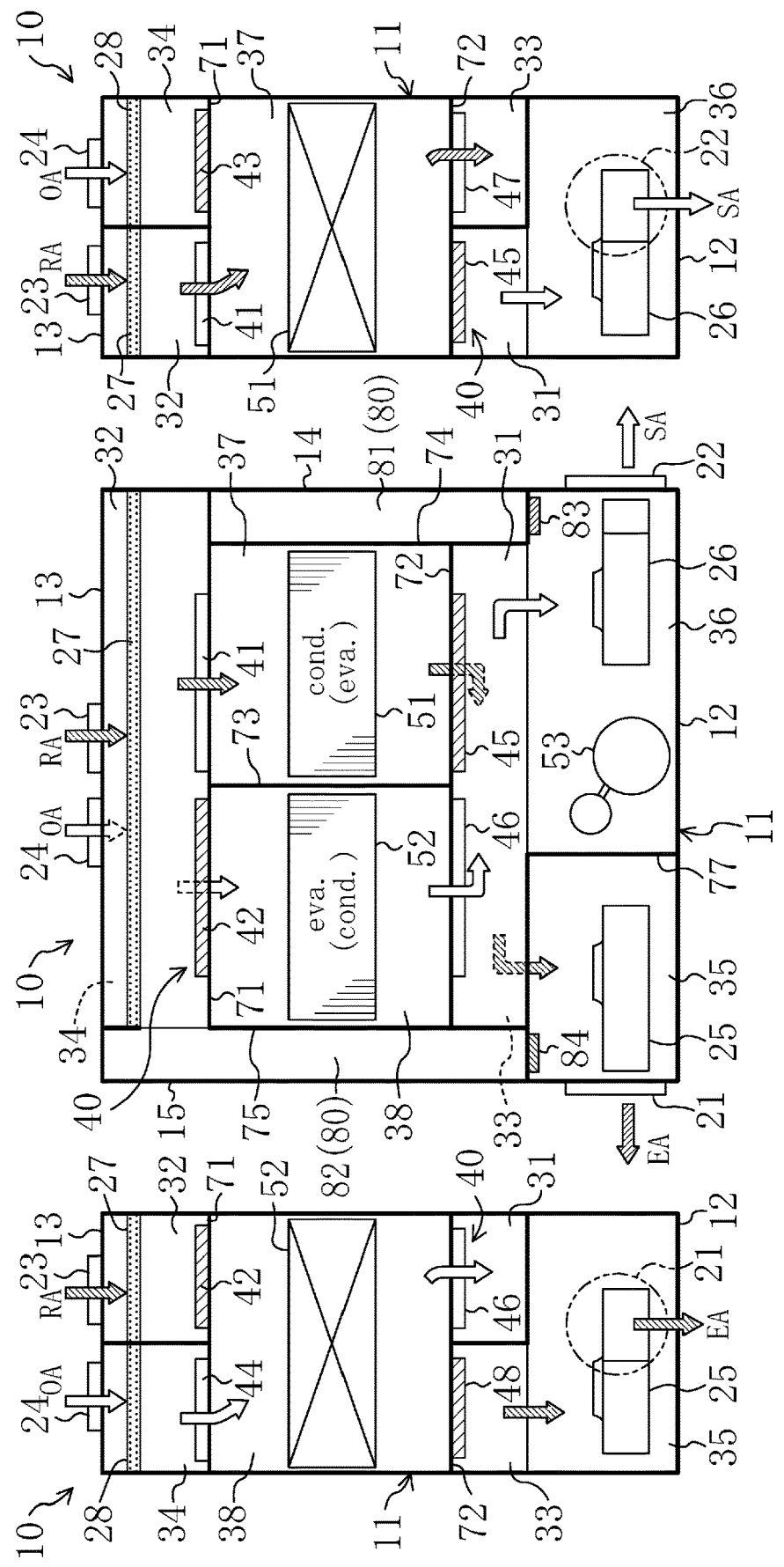
FIG. 9 is a schematic diagram illustrating a second operation of the normal humidity control in the first embodiment.

As illustrated in FIG. 9, in the second operation of the normal humidity control, the air flow passage in the casing (11) is set to the second path. Moreover, a refrigeration cycle operation is performed in the refrigerant circuit (50). More specifically, the refrigerant circuit (50) performs the first refrigeration cycle operation in the normal dehumidification operation, and the refrigerant circuit (50) performs the second refrigeration cycle operation in the normal humidification operation.

The outside air (OA) that has passed through the outside air suction port (24) and taken into the outside air passage (34) flows into the second humidity control chamber (38) through the second outside air damper (44), and passes through the second adsorption heat exchanger (52) in the second humidity control chamber (38) to have its humidity controlled (dehumidified or humidified). More specifically, in the normal dehumidification operation, the outside air (OA) is dehumidified and cooled as it passes through the second adsorption heat exchanger (52) serving as the evaporator, and in the normal humidification operation, the outside air (OA) is humidified and heated as it passes through the second adsorption heat exchanger (52) serving as the condenser. The air the humidity of which has been controlled by the second adsorption heat exchanger (52) passes through the second supply air damper (46), the supply air passage (31), the air supply fan chamber (36), and the air supply port (22) in this order, and is supplied into the room.

The room air (RA) that has passed through the room air suction port (23) and taken into the room air passage (32) flows into the first humidity control chamber (37) through the first room air damper (41), and passes through the first adsorption heat exchanger (51) in the first humidity control chamber (37) to have its humidity controlled (humidified or dehumidified). More specifically, in the normal dehumidification operation, the room air (RA) is humidified and heated as it passes through the first adsorption heat exchanger (51) serving as the condenser. In the normal humidification operation, the room air (RA) is dehumidified and cooled as it passes through the first adsorption heat exchanger (51) serving as the evaporator. The air the humidity of which is controlled by the first adsorption heat exchanger (51) passes through the first air exhaust side damper (47), the exhaust air passage (33), the exhaust fan chamber (35), and the air exhaust port (21) in this order and is exhausted to the outside.

<Bypass Humidity Control (Second Humidity Control Operation)>

The bypass humidity control is an operation for controlling the humidity in a room using the first and second bypass passages (81, 82), and includes a bypass dehumidification operation for dehumidifying a room and a bypass humidification operation for humidifying a room.

In the bypass humidity control, the air supply fan (26) and the exhaust fan (25) are set to be driven. Consequently, the outside air (OA) is taken into the casing (11) through the outside air suction port (24), and the room air (RA) is taken into the casing (11) through the room air suction port (23).

In the bypass humidity control, the first and second bypass passages (81, 82) are opened, and the first and second adsorption heat exchangers (51, 52) are alternately switched to the condenser or the evaporator. The air flow passages in the casing (11) are switched so that the outside air (OA) taken into the casing (11) is supplied into the room through one of the first and second adsorption heat exchangers (51, 52) (more specifically, one of the adsorption heat exchangers serving as the condenser or the evaporator) and one of the first and second bypass passages (81, 82) (in this example, always the first bypass passage (81)), and the room air (RA) taken into the casing (11) is exhausted to the outside through the other adsorption heat exchanger (more specifically, the other adsorption heat exchanger serving as the evaporator or the condenser), and the other one of the first and second bypass passages (81, 82) (in this example, always the second bypass passage (82)). More specifically, the following first operation and the second operation are alternately performed every three minutes.

<<First Operation of Bypass Humidity Control>>

Figure 10:
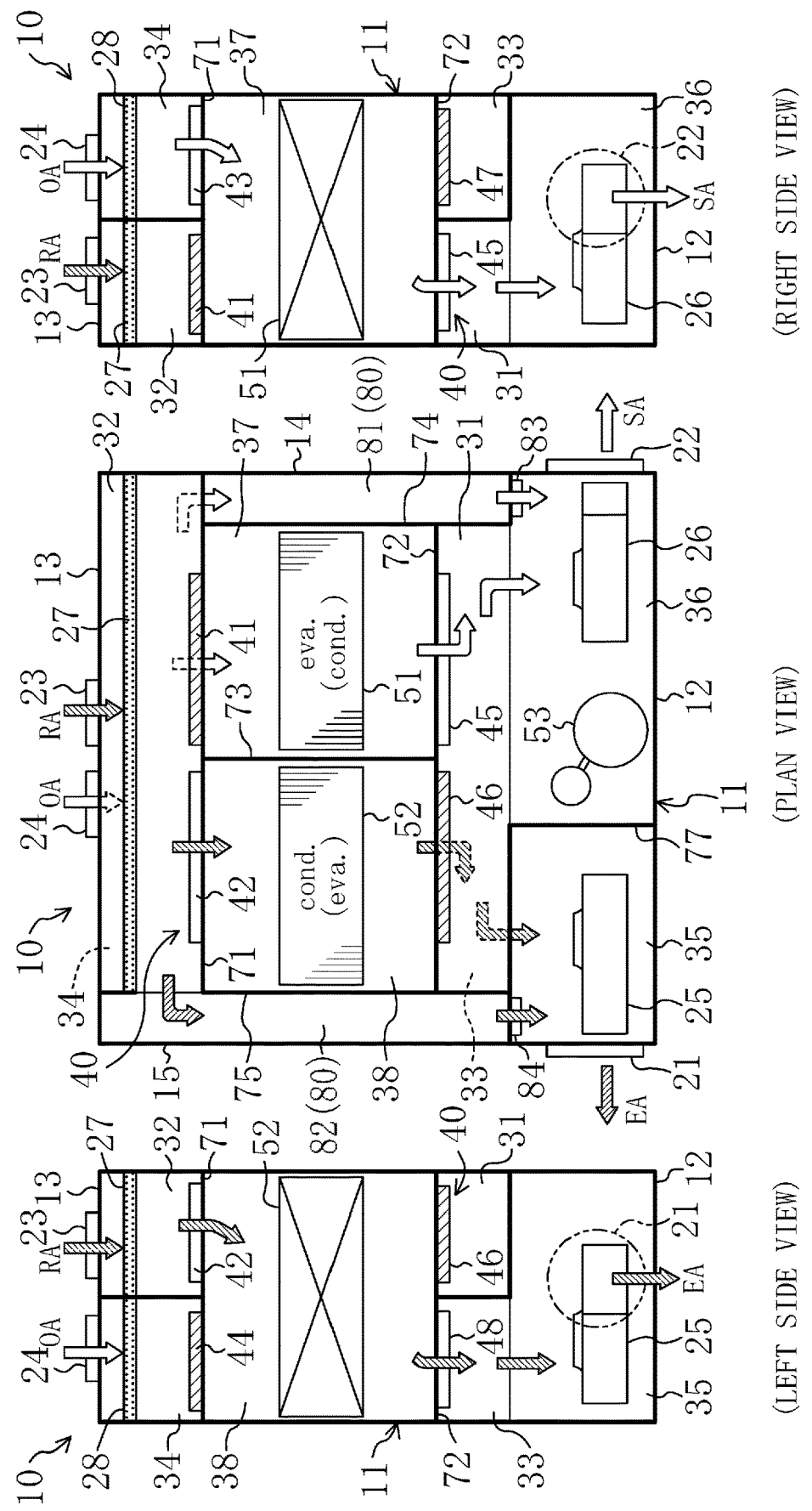
FIG. 10 is a schematic diagram illustrating a first operation of a first operation of bypass humidity control in the first embodiment.

As illustrated in FIG. 10, in the first operation of the bypass humidity control, the flow path switching mechanism (40) sets the air flow passage in the casing (11) to the third path. Moreover, a refrigeration cycle operation is performed in the refrigerant circuit (50). More specifically, the refrigerant circuit (50) performs the second refrigeration cycle operation in the bypass dehumidification operation, and the refrigerant circuit (50) performs the first refrigeration cycle operation in the bypass humidification operation.

A portion of the outside air (OA) that has passed through the outside air suction port (24) and taken into the outside air passage (34) passes through the first outside air damper (43) and flows into the first humidity control chamber (37). The remaining portion of the outside air (OA) passes through the first bypass passage (81) and flows into the air supply fan chamber (36). The outside air (OA) that has flowed into the first humidity control chamber (37) has its humidity controlled (dehumidified or humidified) as it passes through the first adsorption heat exchanger (51) in the first humidity control chamber (37). More specifically, in the bypass dehumidification operation, the outside air (OA) is dehumidified and cooled as it passes through the first adsorption heat exchanger (51) serving as the evaporator, and in the bypass humidification operation, the outside air (OA) is humidified and heated as it passes through the first adsorption heat exchanger (51) serving as the condenser. The air the humidity of which has been controlled by the first adsorption heat exchanger (51) passes through the first supply air damper (45) and the supply air passage (31) in this order, flows into the air supply fan chamber (36), mixed with the air that has passed through the first bypass passage (81) in the air supply fan chamber (36), and is supplied into the room after passing through the air supply port (22).

A portion of the room air (RA) that has passed through the room air suction port (23) and taken into the room air passage (32) passes through the second room air damper (42) and flows into the second humidity control chamber (38). The remaining portion of the room air (RA) passes through the second bypass passage (82) and flows into the air supply fan chamber (36). The room air (RA) that has flowed into the second humidity control chamber (38) has it humidity controlled (humidified or dehumidified) as it passes through the second adsorption heat exchanger (52) in the second humidity control chamber (38). More specifically, in the bypass dehumidification operation, the room air (RA) is humidified and heated as it passes through the second adsorption heat exchanger (52) serving as the condenser, and in the bypass humidification operation, the room air (RA) is dehumidified and cooled as it passes through the second adsorption heat exchanger (52) serving as the evaporator. The air the humidity of which has been controlled by the second adsorption heat exchanger (52) passes through the second exhaust air damper (48) and the exhaust air passage (33) in this order, flows into the exhaust fan chamber (35), mixed with the air that has passed through the second bypass passage (82) in the exhaust fan chamber (35), and is exhausted to the outside after passing through the air exhaust port (21).

<<Second Operation of Bypass Humidity Control>>

Figure 11:
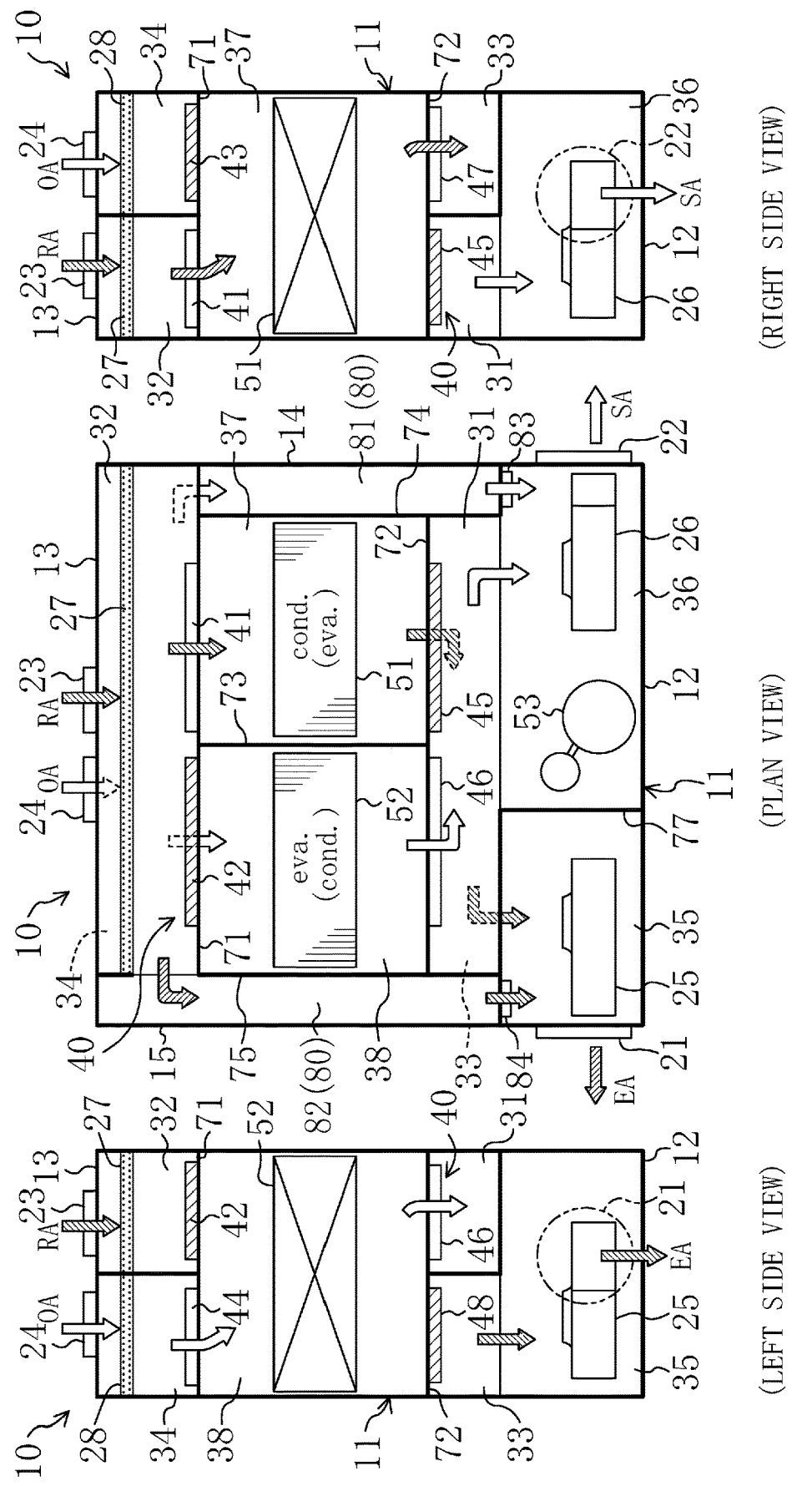
FIG. 11 is a schematic diagram illustrating a second operation of the bypass humidity control in the first embodiment.

As illustrated in FIG. 11, in the second operation of the bypass humidity control, the flow path switching mechanism (40) sets the air flow passage in the casing (11) to the fourth path. Moreover, a refrigeration cycle operation is performed in the refrigerant circuit (50). More specifically, the refrigerant circuit (50) performs the first refrigeration operation in the bypass dehumidification operation, and the refrigerant circuit (50) performs the second refrigeration operation in the bypass humidification operation.

Portion of the outside air (OA) that has passed through the outside air suction port (24) and taken into the outside air passage (34) passes through the second outside air damper (44) and flows into the second humidity control chamber (38). The remaining portion of the outside air (OA) passes through the first bypass passage (81) and flows into the air supply fan chamber (36). The outside air (OA) that has flowed into the second humidity control chamber (38) has its humidity controlled (dehumidified or humidified) as it passes through the second adsorption heat exchanger (52) in the second humidity control chamber (38). More specifically, in the bypass dehumidification operation, the outside air (OA) is dehumidified and cooled as it passes through the second adsorption heat exchanger (52) serving as the evaporator, and in the bypass humidification operation, the outside air (OA) is humidified and heated as it passes through the second adsorption heat exchanger (52) serving as the condenser. The air the humidity of which has been controlled by the second adsorption heat exchanger (52) passes through the second supply air damper (46) and the supply air passage (31) in this order, flows into the air supply fan chamber (36), mixed with the air that has passed through the first bypass passage (81) in the air supply fan chamber (36), and is supplied into the room after passing through the air supply port (22).

Portion of the room air (RA) that has passed through the room air suction port (23) and taken into the room air passage (32) passes through the first room air damper (41) and flows into the first humidity control chamber (37). The remaining portion of the room air (RA) passes through the second bypass passage (82) and flows into the air supply fan chamber (36). The room air (RA) that has flowed into the first humidity control chamber (37) has its humidity controlled (humidified or dehumidified) as it passes through the first adsorption heat exchanger (51) in the first humidity control chamber (37). More specifically, in the bypass dehumidification operation, the room air (RA) is humidified and heated as it passes through the first adsorption heat exchanger (51) serving as the condenser, and in the bypass humidification operation, the room air (RA) is dehumidified and cooled as it passes through the first adsorption heat exchanger (51) serving as the evaporator. The air the humidity of which has been controlled by the first adsorption heat exchanger (51) passes through the first exhaust air damper (47) and the exhaust air passage (33) in this order, flows into the exhaust fan chamber (35), mixed with the air that has passed through the second bypass passage (82) in the exhaust fan chamber (35), and is exhausted to the outside after passing through the air exhaust port (21).

It is to be noted that the correspondence among the operations of the humidity control (normal humidity control and bypass humidity control), the air paths (first to fourth paths), the refrigeration cycle operations (first and second refrigeration cycle operations) performed by the refrigerant circuit (50), and the types of operation (humidification operation and dehumidification operation) are shown in a table in FIG. 12.

<Switching of Operation Modes>

Next, switching of operation modes in the humidity control device (10) will be described with reference to FIG. 13 and FIG. 14. In FIG. 14, a first capacity characteristic curve (L1) indicates a relation between the operating capacity of the compressor (53) and the humidity control capacity of the humidity control device (10) in the normal humidity control (first humidity control operation). A second capacity characteristic curve (L2) indicates a relation between the operating capacity of the compressor (53) and the humidity control capacity of the humidity control device (10) in the bypass humidity control (second humidity control operation).

The controller (95) sets a target operating capacity (Ctg) of the compressor (53) according to the humidity control load of the room (i.e., a difference between the humidity of the room air (RA) and a predetermined target humidity). More specifically, the controller (95) sets the target operating capacity (Ctg) according to the humidity control load of the room such that the target operating capacity (Ctg) of the compressor (53) increases with the increase in the humidity control load of the room.

Figure 13:
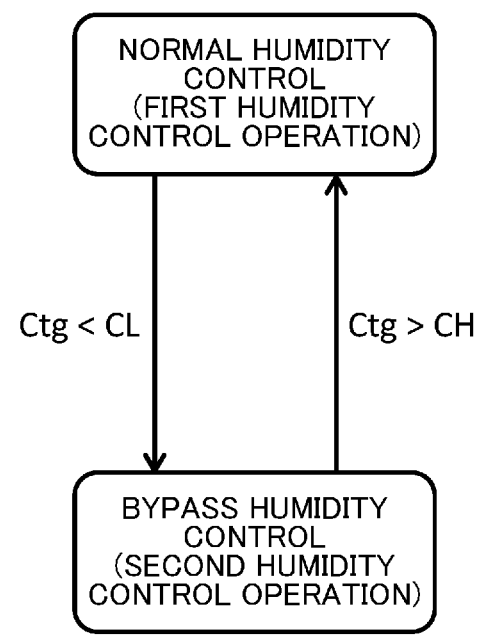
FIG. 13 is a state transition diagram illustrating the switching of operation modes.
Figure 14:
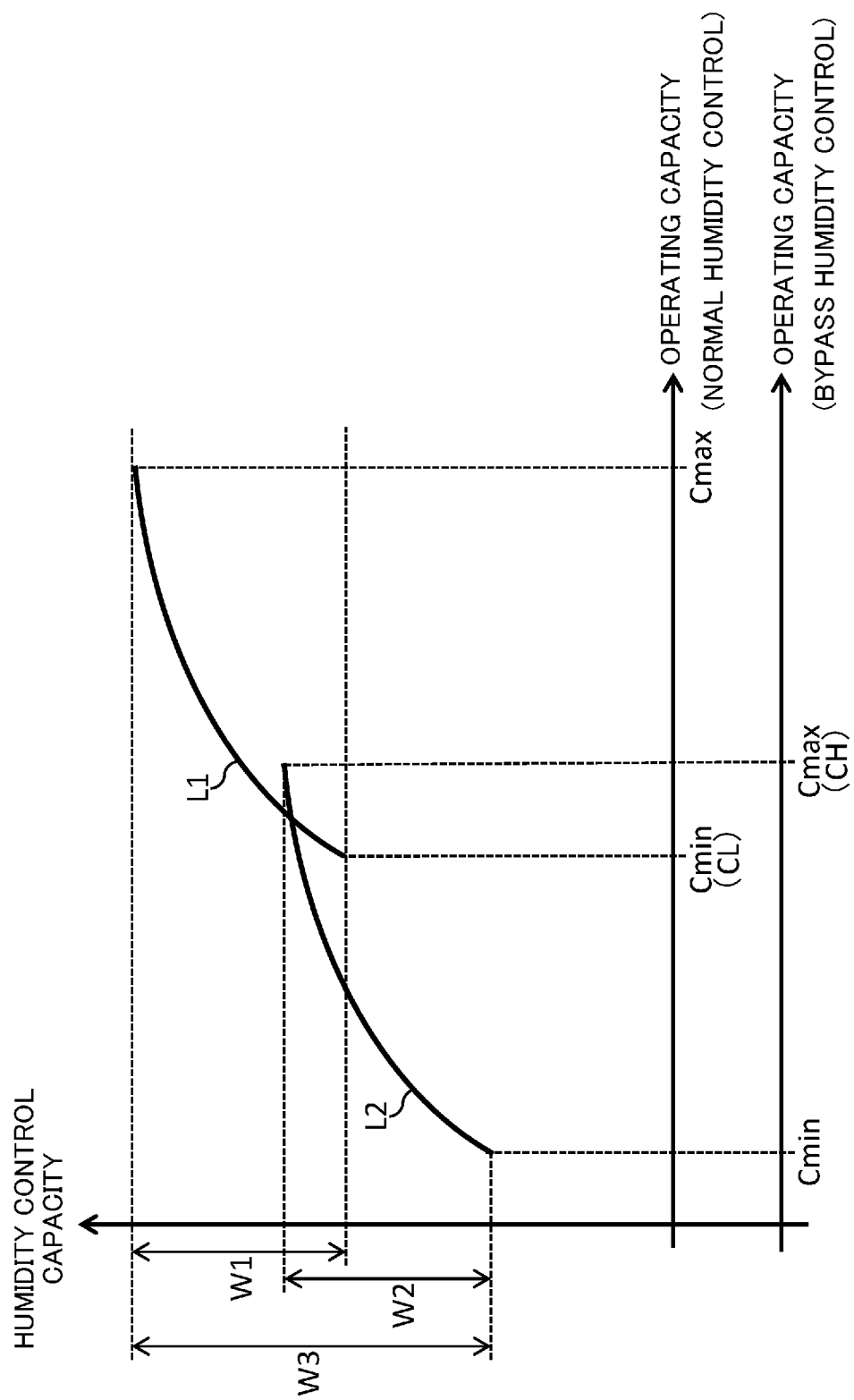
FIG. 14 is a graph illustrating relations among the operation modes, the operating capacity of the compressor, and the humidity control capacity.

As illustrated in FIG. 13, when the target operating capacity (Ctg) of the compressor (53) falls below a predetermined lower limit operating capacity (CL) while the normal humidity control is performed, the controller (95) controls the refrigerant circuit (50) and the flow path switching mechanism (40) to switch from the normal humidity control to the bypass humidity control.

The lower limit operating capacity (CL) in the normal humidity control is set to the operating capacity that is equal to or more than a minimum operating capacity (Cmin) of the compressor (53) and equal to or less than a first operating capacity. The first operating capacity corresponds to the operating capacity of the compressor (53) when the humidity control capacity of the humidity control device (10) in the normal humidity control is equivalent to the maximum value of the humidity control capacity of the humidity control device (10) in the bypass humidity control (i.e., the humidity control capacity of the humidity control device (10) when the operating capacity of the compressor (53) is a maximum operating capacity (Cmax) in the bypass humidity control). The humidity control capacity of the humidity control device (10) in the bypass humidity control can be estimated based on the flow rate of air that passes through the adsorption heat exchangers (51, 52) and the operating capacity of the compressor (53) in the bypass humidity control.

Moreover, as illustrated in FIG. 13, when the target operating capacity (Ctg) of the compressor (53) exceeds a predetermined upper limit operating capacity (CH) while the bypass humidity control is performed, the controller (95) controls the refrigerant circuit (50) and the flow path switching mechanism (40) to switch from the bypass humidity control to the normal humidity control.

The upper limit operating capacity (CH) in the bypass humidity control is set to the operating capacity that is equal to or more than a second operating capacity and equal to or less than the maximum operating capacity (Cmax) of the compressor (53). The second operating capacity corresponds to the operating capacity of the compressor (53) when the humidity control capacity of the humidity control device (10) in the bypass humidity control is equivalent to the minimum value of the humidity control capacity of the humidity control device (10) in the normal humidity control (i.e., the humidity control capacity of the humidity control device (10) when the operating capacity of the compressor (53) is the minimum operating capacity (Cmin) in the normal humidity control). The humidity control capacity of the humidity control device (10) in the normal humidity control can be estimated based on the flow rate of air that passes through the adsorption heat exchangers (51, 52) and the operating capacity of the compressor (53) in the normal humidity control.

In the example of FIG. 14, the lower limit operating capacity (CL) is set to the minimum operating capacity (Cmin) of the compressor (53), and the upper limit operating capacity (CH) is set to the maximum operating capacity (Cmax) of the compressor (53). Moreover, the first humidity control capacity corresponding to the operating capacity of the compressor (53) being the lower limit operating capacity (CL) in the normal humidity control is lower than the second humidity control capacity corresponding to the operating capacity of the compressor (53) being the upper limit operating capacity (CH) in the bypass humidity control.

<Adjustment Width of Humidity Control Capacity>

Next, with reference to FIG. 14, an adjustment width (width of adjustable range) of the humidity control capacity of the humidity control device (10) will be described. In FIG. 14, the adjustment width (W1) indicates the adjustment width of the humidity control capacity of the humidity control device (10) in the normal humidity control. The adjustment width (W2) indicates the adjustment width of the humidity control capacity of the humidity control device (10) in the bypass humidity control. The humidity control width (W3) indicates the adjustment width of the humidity control capacity of the humidity control device (10) when the normal humidity control and the bypass humidity control are interchangeably performed.

The humidity control capacity in the humidity control depends on the operating capacity of the compressor (53) and the flow rate of air that passes through the first and second adsorption heat exchangers (51, 52) (will be hereinafter referred to as the "amount of air passing through the first and second adsorption heat exchangers (51, 52)"). In other words, the humidity control capacity of the humidity control device (10) tends to increase with the increase in the operating capacity of the compressor (53), and the humidity control capacity of the humidity control device (10) tends to increase with the increase in the amount of air passing through the adsorption heat exchangers (51, 52).

In the bypass humidity control, the outside air (OA) is diverged into the adsorption heat exchangers (51, 52) and the first bypass passage (81), and the room air (RA) is diverged into the adsorption heat exchangers (51, 52) and the second bypass passage (82). Consequently, the amount of air passing through the adsorption heat exchangers (51, 52) in the bypass humidity control is less than the amount of air passing through the adsorption heat exchangers (51, 52) in the normal humidity control.

Consequently, switching from the normal humidity control to the bypass humidity control can reduce the amount of air passing through the adsorption heat exchangers (51, 52), and shift the adjustable range of the humidity control capacity of the humidity control device (10) to the negative side (lower side). Conversely, switching from the bypass humidity control to the normal humidity control can increase the amount of air passing through the adsorption heat exchangers (51, 52), and shift the adjustable range of the humidity control capacity of the humidity control device (10) to the positive side (higher side).

Advantages of First Embodiment

As described above, switching between the normal humidity control and the bypass humidity control makes it possible to shift the adjustable range of the humidity control capacity of the humidity control device (10). More specifically, switching the normal humidity control to the bypass humidity control if the target operating capacity (Ctg) of the compressor (53) falls below the lower limit operating capacity (CL) in the normal humidity control makes it possible to shift the adjustable range of the humidity control capacity of the humidity control device (10) to the negative side in a situation where there is no allowance to adjust the humidity control capacity of the humidity control device (10) to the negative side. Further, switching the bypass humidity control to the normal humidity control if the target operating capacity (Ctg) of the compressor (53) exceeds the upper limit operating capacity (CH) in the bypass humidity control makes it possible to shift the adjustable range of the humidity control capacity of the humidity control device (10) to the positive side in a situation where there is no allowance to adjust the humidity control capacity of the humidity control device (10) to the positive side.

In this manner, the switching between the normal humidity control and the bypass humidity control can shift the adjustable range of the humidity control capacity of the humidity control device (10), and thus, it is possible to further broaden the adjustment width (width of adjustable range) of the humidity control capacity of the humidity control device (10) than the case where only the normal humidity control is performed.

Moreover, if the lower limit operating capacity (CL) and the upper limit operating capacity (CH) are set such that the first humidity control capacity (humidity control capacity of the humidity control device (10) corresponding to the operating capacity of the compressor (53) being the lower limit operating capacity (CL) in the normal humidity control) is lower than the second humidity control capacity (humidity control capacity of the humidity control device (10) corresponding to the operating capacity of the compressor (53) being the upper limit operating capacity (CH) in the bypass humidity control), it is possible to avoid the bypass humidity control, which has just been switched from the normal humidity control, from returning to the normal humidity control due to the operating capacity of the compressor (53) exceeding the upper limit operating capacity (CH). Further, it is also possible to avoid the normal humidity control, which has just been switched from the bypass humidity control, from returning to the bypass humidity control due to the operating capacity of the compressor (53) falling below the lower limit operating capacity (CL). This can reduce the possibility of frequent switching between the normal humidity control and the bypass humidity control (i.e., hunting).

When the humidity control capacity lower than the adjustable range of the humidity control capacity of the humidity control device (10) is required to control the humidity in the room (i.e., when the humidity control load in the room is relatively low), the compressor (53) of the humidity control device (10) is started and stopped repeatedly. Moreover, the power consumption of the humidity control device (10) tends to increase with the increase in the frequency of repeated start and stop of the compressor (53). Furthermore, when the compressor (53) is switched from the stop state to the driving state (i.e., when the compressor (53) is activated), it is preferable to set the air supply fan (26) and the exhaust fan (25) to the stop state in order to secure the difference between the high pressure and the low pressure in the refrigerant circuit (50). However, if the air supply fan (26) and the exhaust fan (25) are stopped, the ventilation in the room is stopped, as a result of which the ventilation amount in the room will be lowered.

In the humidity control device (10) of this embodiment, the width of the adjustable range of the humidity control capacity of the humidity control device (10) can be broadened (particularly, the adjustable range of the humidity control capacity of the humidity control device (10) can be further broadened to the negative side than when only the normal humidity control is performed). Thus, it is possible to reduce the frequency of repeated start and stop of the compressor (53). This can further reduce the power consumption of the humidity control device (10) than when only the normal humidity control is performed. Moreover, reducing the frequency of repeated start and stop of the compressor (53) can prevent the ventilation amount in the room from decreasing when the air supply fan (26) and the exhaust fan (25) are stopped by the activation of the compressor (53).

Modification of First Embodiment

In the humidity control device (10) of the first embodiment, the controller (95) may also be configured as follows. Specifically, when a predetermined anti-condensation condition is satisfied during the bypass humidity control (second humidity control operation), the controller (95) may control the refrigerant circuit (50) and the flow path switching mechanism (40) so as to finish the bypass humidity control (for example, so as to switch from the bypass humidity control to the normal humidity control).

The anti-condensation condition is a condition predetermined for preventing condensation in at least one of the first and second humidity control chambers (37, 38) and the first and second bypass passages (81, 82). For example, the anti-condensation condition includes a condition that the evaporation temperature of the refrigerant in the adsorption heat exchanger (51) or (52) serving as the evaporator is below an anti-condensation temperature of the adsorption heat exchanger (51, 52) (in other words, a condition for preventing condensation in the humidity control chambers (37, 38)). It is to be noted that the anti-condensation temperature of the adsorption heat exchanger (51, 52) is set to the temperature at which condensation probably occurs in the adsorption heat exchanger (51, 52) serving as the evaporator (more specifically, a temperature slightly higher than the dew-point temperature of the outside air (OA)).

The anti-condensation condition may also include a condition that the temperature of the room air (RA) is below the anti-condensation temperature of the bypass passage (in this example, the first bypass passage (81)) and the humidity control chambers (37, 38) through which the outside air (OA) passes (in other words, a condition for preventing condensation in the bypass passage and the humidity control chambers (37, 38) through which the outside air (OA) passes). It is to be noted that the anti-condensation temperature of the bypass passage and the humidity control chambers (37, 38) through which the outside air (OA) passes is set to the temperature at which condensation probably occurs in the bypass passage and the humidity control chambers (37, 38) through which the outside air (OA) passes (more specifically, a temperature slightly higher than the dew-point temperature of the outside air (OA)).

Through the above-described control, it is possible to finish the bypass humidity control when the anti-condensation condition is satisfied in the bypass humidity control. This can prevent the condensation in at least one of the first and second humidity control chambers (37, 38) and the first and second bypass passages (81, 82).

Second Embodiment

FIG. 15 is a configuration example of the humidity control device (10) of a second embodiment. Just like the humidity control device (10) of the first embodiment, the humidity control device (10) of the second embodiment includes the casing (11), the refrigerant circuit (50), the flow path switching mechanism (40), and the controller (95).

In the humidity control device (10) of the second embodiment, the configurations of the bypass passage (80) and the flow path switching mechanism (40) are different from those of the humidity control device (10) of the first embodiment. In the humidity control device (10) of the second embodiment, the bypass passage (80) is comprised of the first bypass passage (81), and the flow path switching mechanism (40) is comprised of the eight dampers (41-48) and the first bypass damper (83). In other words, in the humidity control device (10) of the second embodiment, the second bypass passage (82) and the second bypass damper (84) illustrated in FIG. 1 to FIG. 4 are omitted. Other configurations are the same as those in the humidity control device (10) of the first embodiment.

<Casing>

In the second embodiment, unlike the first embodiment, the casing (11) is not provided with the second partition plate (75) and the partition plate (79) illustrated in FIG. 1 to FIG. 4, and the left end of the upstream partition plate (71) and the left end of the downstream partition plate (72) are connected to the second side panel (15). The other configurations are the same as those in the casing (11) of the first embodiment.

<Flow Path Switching Mechanism>

In the second embodiment, just like in the first embodiment, the flow path switching mechanism (40) is configured to switch the air flow passage in the casing (11). More specifically, the flow path switching mechanism (40) switches the air flow passage in the casing (11) to a first path (FIG. 17), a second path (FIG. 18), a third path (FIG. 19), and a fourth path (FIG. 20), by opening and closing the eight dampers (41) to (48) and the bypass damper (83). The closed dampers are hatched in FIG. 17 to FIG. 20.

<<First Path>>

To form the first path (FIG. 17), the first bypass damper (83) is closed; the second room air damper (42), the first outside air damper (43), the first supply air damper (45), and the second exhaust air damper (48) are opened; and the first room air damper (41), the second outside air damper (44), the second supply air damper (46), and the first exhaust air damper (47) are closed. In this state, the first bypass passage (81) is closed, and the outside air (OA) taken into the casing (11) is supplied into the room through the first adsorption heat exchanger (51), and the room air (RA) taken into the casing (11) is exhausted to the outside through the second adsorption heat exchanger (52).

<<Second Path>>

To form the second path (FIG. 18), the first bypass damper (83) is closed; the first room air damper (41), the second outside air damper (44), the second supply air damper (46), and the first exhaust air damper (47) are opened; and the second room air damper (42), the first outside air damper (43), the first supply air damper (45), and the second exhaust air damper (48) are closed. In this state, the first bypass passage (81) is closed, and the outside air (OA) taken into the casing (11) is supplied into the room through the second adsorption heat exchanger (52), and the room air (RA) taken into the casing (11) is exhausted to the outside through the first adsorption heat exchanger (51).

<<Third Path>>

To form the third path (FIG. 19), the first bypass damper (83) is opened; the second room air damper (42), the first outside air damper (43), the first supply air damper (45), and the second exhaust air damper (48) are opened; and the first room air damper (41), the second outside air damper (44), the second supply air damper (46), and the first exhaust air damper (47) are closed. In this state, the first bypass passage (81) is opened, and the outside air (OA) taken into the casing (11) is supplied into the room through the first adsorption heat exchanger (51) and the first bypass passage (81), and the room air (RA) taken into the casing (11) is exhausted to the outside through the second adsorption heat exchanger (52).

<<Fourth Path>>

To form the fourth path (FIG. 20), the first bypass damper (83) is opened; the first room air damper (41), the second outside air damper (44), the second supply air damper (46), and the first exhaust air damper (47) are opened; and the second room air damper (42), the first outside air damper (43), the first supply air damper (45), and the second exhaust air damper (48) are closed. In this state, the first bypass passage (81) is opened, and the outside air (OA) taken into the casing (11) is supplied into the room through the second adsorption heat exchanger (52) and the first bypass passage (81), and the room air (RA) taken into the casing (11) is exhausted to the outside through the first adsorption heat exchanger (51).

The correspondence among the air paths (first to fourth paths), the opening and closing of the dampers (41-48, 83), the type of air (outside air (OA) and room air (RA)) that passes through the adsorption heat exchangers (51, 52) are shown in a table in FIG. 16.

<Controller>

In the second embodiment, just in the first embodiment, the controller (95) controls the flow path switching mechanism (40) and refrigerant circuit (50) of the humidity control device (10) based on the detected values and signals supplied thereto. More specifically, the controller (95) controls the dampers (41-48, 83), the fans (25, 26), the compressor (53), the electric expansion valve (55), and the four-way switching valve (54).

Moreover, in the second embodiment, just like in the first embodiment, the controller (95) controls the refrigerant circuit (50) and the flow path switching mechanism (40) so that the humidity control device (10) selectively performs the normal humidity control (first humidity control operation) and the bypass humidity control (second humidity control operation).

<Normal humidity control (First Humidity Control Operation)>

The normal humidity control is an operation for controlling the humidity in a room without using the first bypass passage (81), and includes the normal dehumidification operation for dehumidifying the room and the normal humidification operation for humidifying the room.

In the normal humidity control, the air supply fan (26) and the exhaust fan (25) are set to be driven. Consequently, the outside air (OA) passes through the outside air suction port (24) and is taken into the casing (11), and the room air (RA) passes through the room air suction port (23) and is taken into the casing (11).

Moreover, in the normal humidity control, the first bypass passage (81) is closed, and the first and second adsorption heat exchangers (51, 52) are alternately switched to the condenser or the evaporator. The air flow passages in the casing (11) are switched so that the outside air (OA) taken into the casing (11) is supplied into the room through one of the first and second adsorption heat exchangers (51, 52) (more specifically, one of the adsorption heat exchangers serving as the condenser or the evaporator), and the room air (RA) taken into the casing (11) is exhausted to the outside through the other of the first and second adsorption heat exchangers (51, 52) (more specifically, the other adsorption heat exchanger serving as the evaporator or the condenser). More specifically, the following first operation and the second operation are alternately performed every three minutes.

<<First Operation of Normal Humidity Control>>

Figure 17:
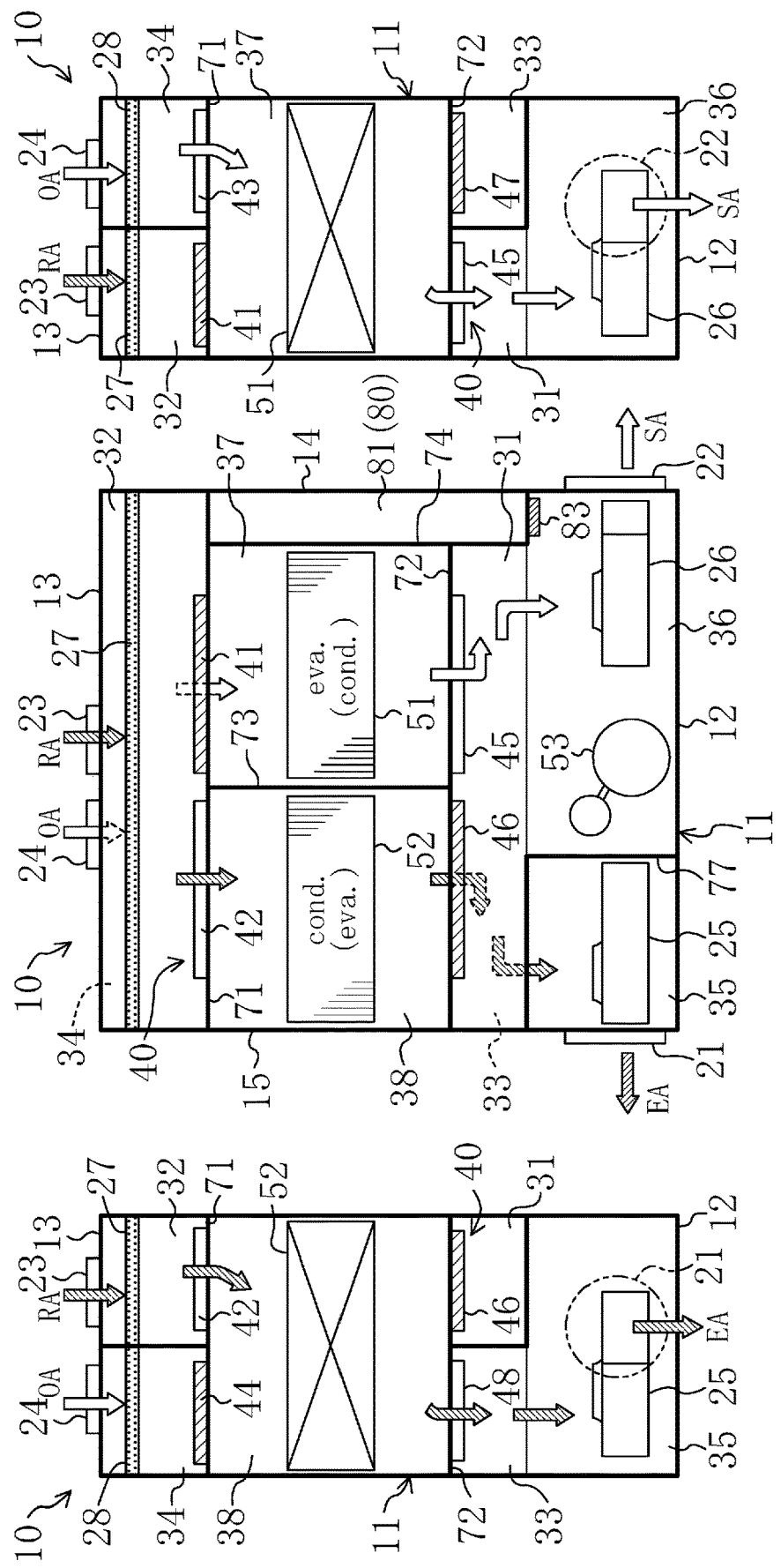
FIG. 17 is a schematic diagram illustrating a first operation of normal humidity control in the second embodiment.

As illustrated in FIG. 17, in the first operation of the normal humidity control, the air flow passage in the casing (11) is set to the first path. Moreover, a refrigeration cycle operation is performed in the refrigerant circuit (50). More specifically, the refrigerant circuit (50) performs the second refrigeration cycle operation in the normal dehumidification operation, and the first refrigeration cycle operation in the normal humidification operation. It is to be noted that the flow of the outside air (OA) and the room air (RA) in the first operation of the normal humidity control in the second embodiment is the same as the flow of the outside air (OA) and the room air (RA) in the first operation of the normal humidity control in the first embodiment (see FIG. 8).

<<Second Operation of Normal Humidity Control>>

Figure 18:
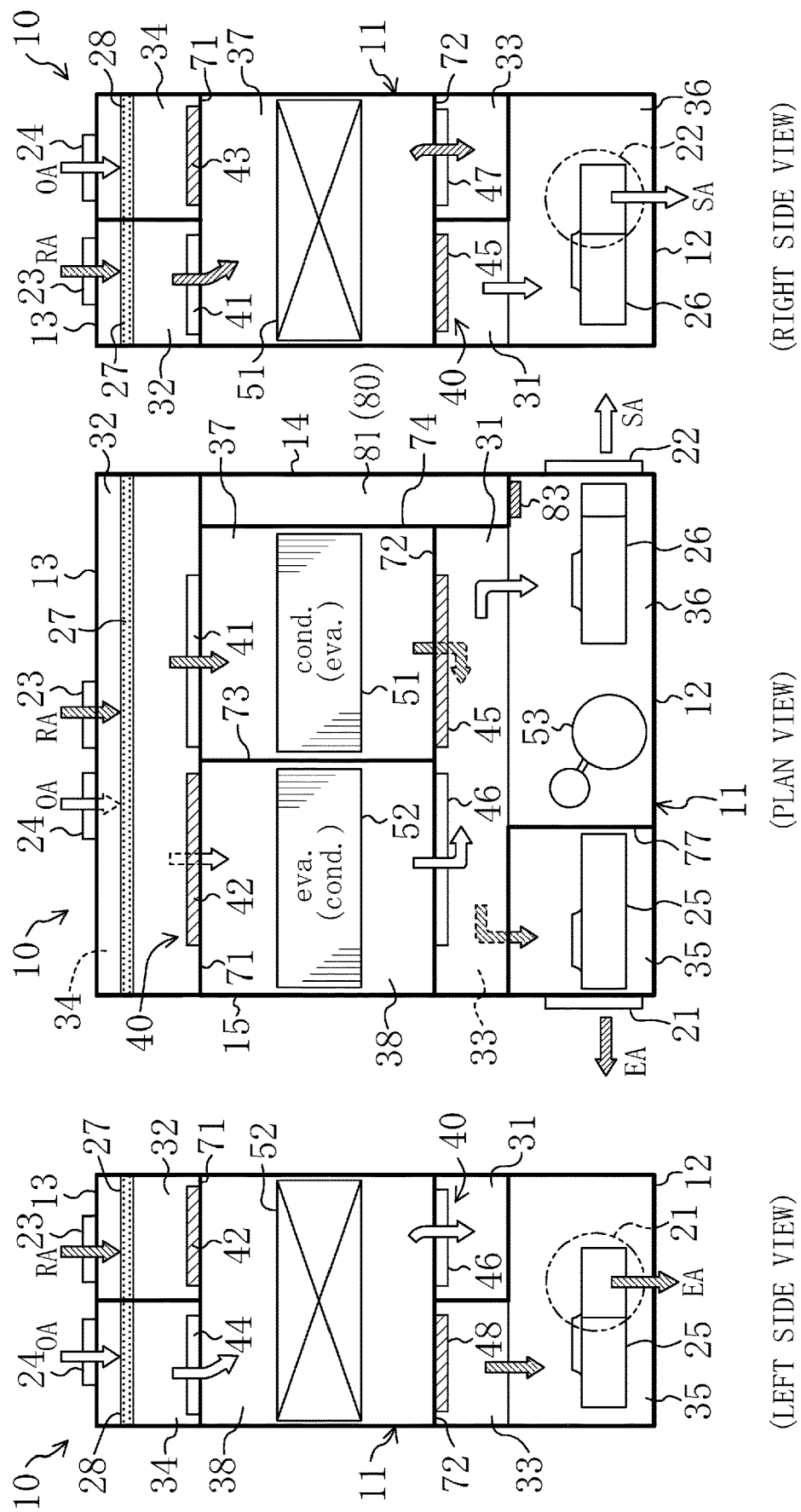
FIG. 18 is a schematic diagram illustrating a second operation of the normal humidity control in the second embodiment.

As illustrated in FIG. 18, in the second operation of the normal humidity control, the air flow passage in the casing (11) is set to the second path. Moreover, a refrigeration cycle operation is performed in the refrigerant circuit (50). More specifically, the refrigerant circuit (50) performs the first refrigeration cycle operation in the normal dehumidification operation, and the second refrigeration cycle operation in the normal humidification operation. It is to be noted that the flow of the outside air (OA) and the room air (RA) in the second operation of the normal humidity control in the second embodiment is the same as the flow of the outside air (OA) and the room air (RA) in the second operation of the normal humidity control in the first embodiment (see FIG. 9).

<Bypass Humidity Control (Second Humidity Control Operation)>

The bypass humidity control is an operation for controlling the humidity in a room by using the first bypass passage (81), and includes the bypass dehumidification operation for dehumidifying the room and the bypass humidification operation for humidifying the room.

In the bypass humidity control, the air supply fan (26) and the exhaust fan (25) are set to be driven. Consequently, the outside air (OA) passes through the outside air suction port (24) and is taken into the casing (11), and the room air (RA) passes through the room air suction port (23) and is taken into the casing (11).

Moreover, in the bypass humidity control, the first bypass passage (81) is opened, and the first and second adsorption heat exchangers (51, 52) are alternately switched to the condenser or the evaporator. The air flow passages in the casing (11) are switched so that the outside air (OA) taken into the casing (11) is supplied into the room through one of the first and second adsorption heat exchangers (51, 52) (more specifically, one of the adsorption heat exchangers serving as the condenser or the evaporator) and the first bypass passage (81), and the room air (RA) taken into the casing (11) is exhausted to the outside through the other of the first and second adsorption heat exchangers (51, 52) (more specifically, the other of the adsorption heat exchangers serving as the evaporator or the condenser). More specifically, the following first operation and the second operation are alternately performed every three minutes.

<<First Operation of Bypass Humidity Control>>

Figure 19:
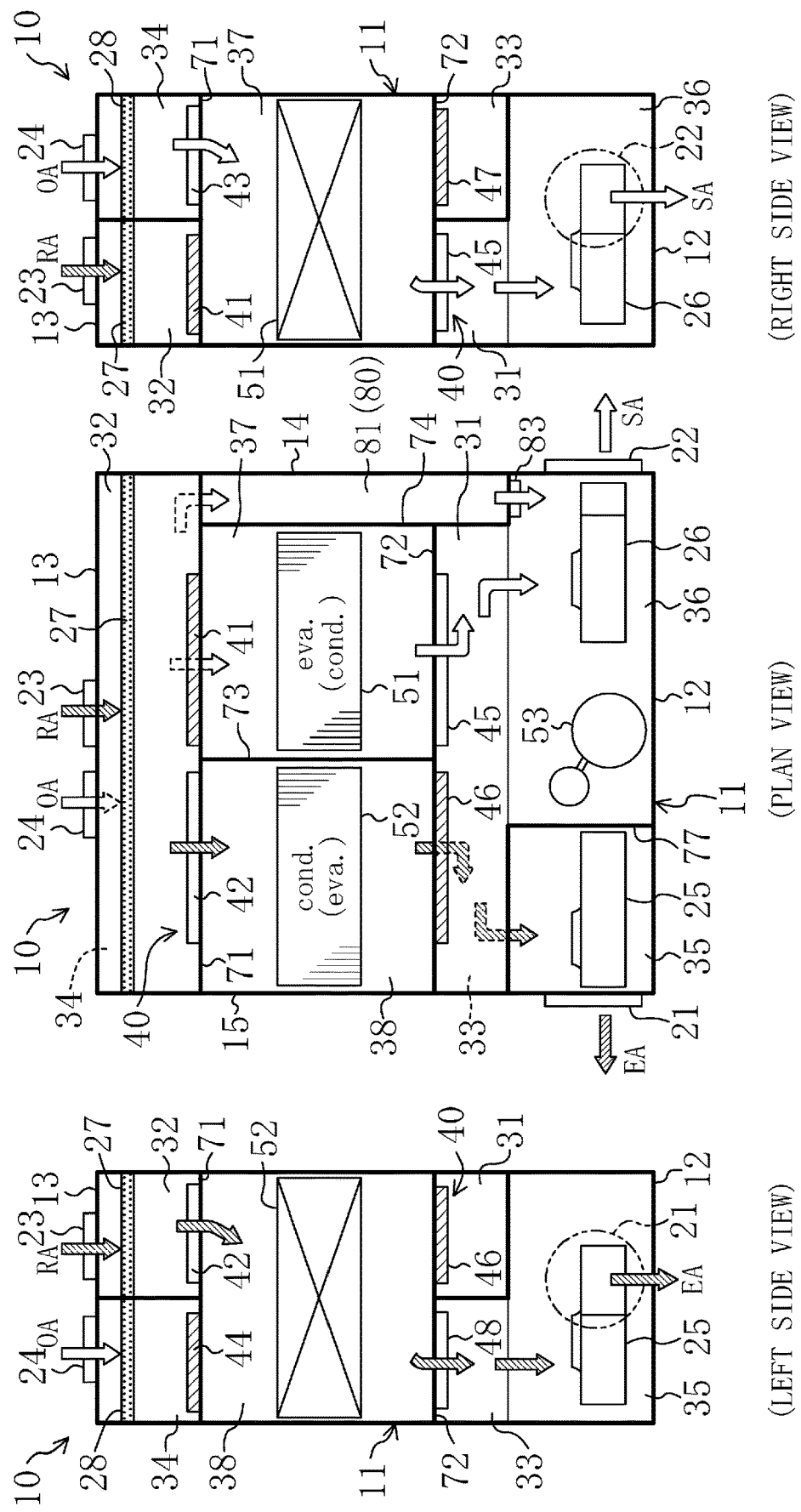
FIG. 19 is a schematic diagram illustrating a first operation of bypass humidity control in the second embodiment.

As illustrated in FIG. 19, in the first operation of the bypass humidity control, the flow path switching mechanism (40) sets the air flow passage in the casing (11) to the third path. Moreover, a refrigeration cycle operation is performed in the refrigerant circuit (50). More specifically, the refrigerant circuit (50) performs the second refrigeration cycle operation in the bypass dehumidification operation, and the first refrigeration cycle operation in the bypass humidification operation. It is to be noted that the flow of the outside air (OA) in the first operation of the bypass humidity control in the second embodiment is the same as the flow of the outside air (OA) in the first operation of the bypass humidity control in the first embodiment (see FIG. 10).

The room air (RA) that has passed through the room air suction port (23) and taken into the room air passage (32) flows into the second humidity control chamber (38) through the second room air damper (42). The room air (RA) that has flowed into the second humidity control chamber (38) has its humidity controlled (humidified or dehumidified) as it passes through the second adsorption heat exchanger (52) in the second humidity control chamber (38). The air the humidity of which has been controlled by the second adsorption heat exchanger (52) passes through the second exhaust air damper (48) and the exhaust air passage (33) in this order, flows into the exhaust fan chamber (35), and is exhausted to the outside after passing through the air exhaust port (21).

<<Second Operation of Bypass Humidity Control>>

Figure 20:
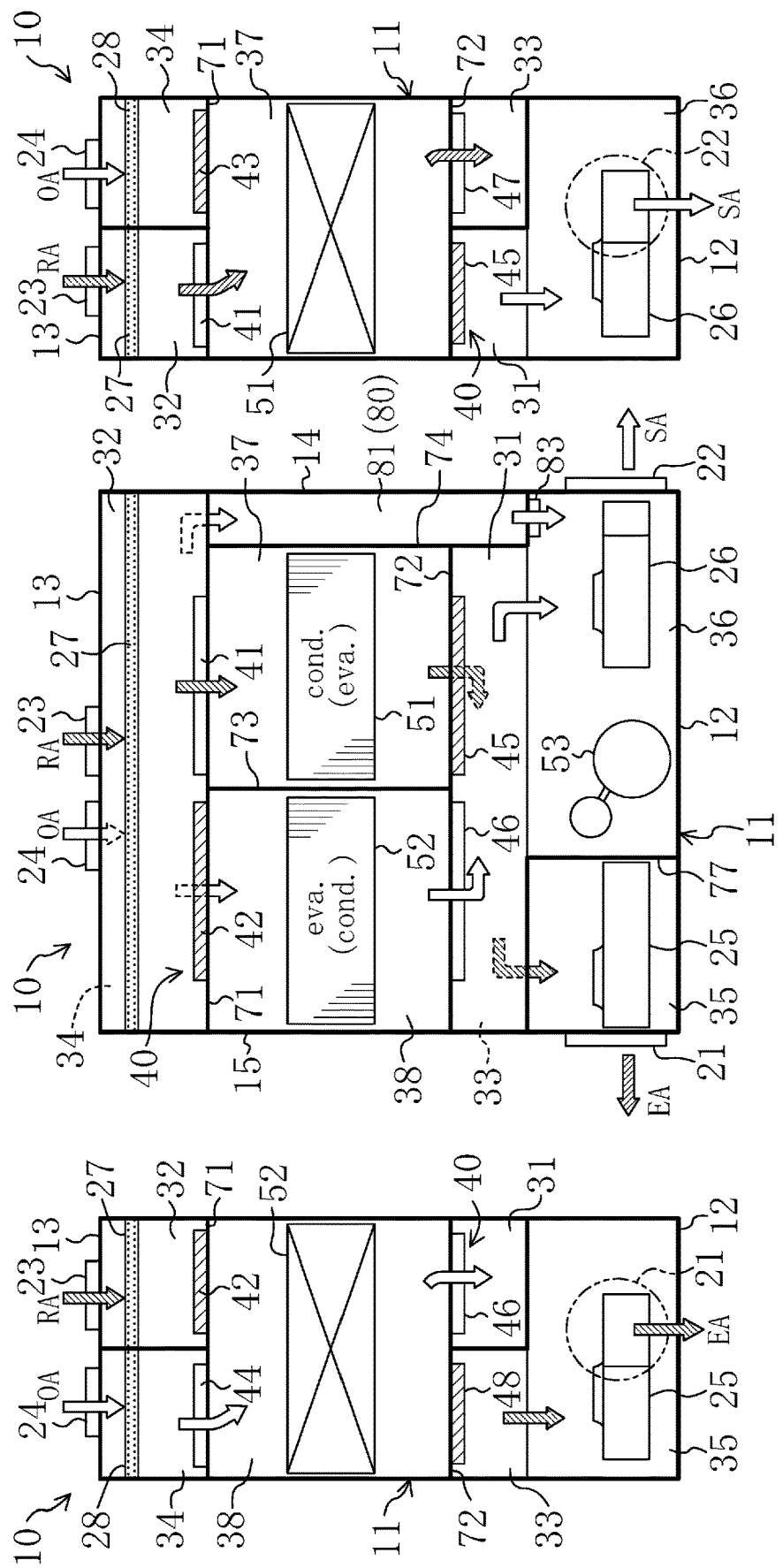
FIG. 20 is a schematic diagram illustrating a second operation of the bypass humidity control in the second embodiment.

As illustrated in FIG. 20, in the second operation of the bypass humidity control, the flow path switching mechanism (40) sets the air flow passage in the casing (11) to the fourth path. Moreover, a refrigeration cycle operation is performed in the refrigerant circuit (50). More specifically, the refrigerant circuit (50) performs the first refrigeration cycle operation in the bypass dehumidification operation, and the second refrigeration cycle operation in the bypass humidification operation. The flow of the outside air (OA) in the second operation of the bypass humidity control in the second embodiment is the same as the flow of the outside air (OA) in the second operation of the bypass humidity control in the first embodiment (see FIG. 11).

The room air (RA) that has passed through the room air suction port (23) and taken into the room air passage (32) flows into the first humidity control chamber (37) through the first room air damper (41). The room air (RA) that has flowed into the first humidity control chamber (37) has its humidity controlled (humidified or dehumidified) as it passes through the first adsorption heat exchanger (51) in the first humidity control chamber (37). The air the humidity of which has been controlled by the first adsorption heat exchanger (51) passes through the first exhaust air damper (47) and the exhaust air passage (33) in this order, flows into the exhaust fan chamber (35), and is exhausted to the outside after passing through the air exhaust port (21).

The correspondence among the operation of the humidity control (normal humidity control and bypass humidity control), the air paths (first to fourth paths), the refrigeration cycle operation (first and second refrigeration cycle operations) of the refrigerant circuit (50), and the operation state (humidification operation and dehumidification operation) are shown in a table in FIG. 12, just like in the first embodiment.

<Switching of Operation Modes>

The switching of operation modes in the humidity control device (10) in the second embodiment is the same as the switching of operation modes in the humidity control device (10) in the first embodiment. More specifically, in the second embodiment, just like in the first embodiment, the controller (95) sets the target operating capacity (Ctg) of the compressor (53) according to the humidity control load in the room (i.e., difference between the humidity of the room air (RA) and a predetermined target humidity). As illustrated in FIG. 13, when the target operating capacity (Ctg) of the compressor (53) falls below the predetermined lower limit operating capacity (CL) while the normal humidity control is performed, the controller (95) controls the refrigerant circuit (50) and the flow path switching mechanism (40) to perform switching from the normal humidity control to the bypass humidity control. Moreover, as illustrated in FIG. 13, when the target operating capacity (Ctg) of the compressor (53) exceeds the predetermined upper limit operating capacity (CH) while the bypass humidity control is performed, the controller (95) controls the refrigerant circuit (50) and the flow path switching mechanism (40) to perform switching from the bypass humidity control to the normal humidity control.

<Adjustment Width of Humidity Control Capacity>

Moreover, in the second embodiment, just like in the first embodiment, the first capacity characteristic curve (L1) illustrated in FIG. 14 indicates the relation between the operating capacity of the compressor (53) and the humidity control capacity of the humidity control device (10) in the normal humidity control (first humidity control operation), and the second capacity characteristic curve (L2) illustrated in FIG. 14 indicates the relation between the operating capacity of the compressor (53) and the humidity control capacity of the humidity control device (10) in the bypass humidity control (second humidity control operation). The adjustment width (W1) illustrated in FIG. 14 indicates the adjustment width of the humidity control capacity of the humidity control device (10) in the normal humidity control. The adjustment width (W2) illustrated in FIG. 14 indicates the adjustment width of the humidity control capacity of the humidity control device (10) in the bypass humidity control. The humidity control width (W3) indicates the adjustment width of the humidity control capacity of the humidity control device (10), when the normal humidity control and the bypass humidity control are interchangeably performed.

The humidity control capacity of the humidity control operation depends on the operating capacity of the compressor (53) and the flow rate of air that passes through the first and second adsorption heat exchangers (51, 52) (particularly, the amount of the outside air (OA) that passes through the adsorption heat exchangers (51, 52)). In other words, the humidity control capacity of the humidity control device (10) tends to increase with the increase in the operating capacity of the compressor (53), and the humidity control capacity of the humidity control device (10) tends to increase with the increase in the amount of the outside air (OA) that passes through the adsorption heat exchangers (51, 52).

In the bypass humidity control, the outside air (OA) is diverged into the adsorption heat exchangers (51, 52) and the first bypass passage (81). Consequently, the amount of the outside air (OA) that passes through the adsorption heat exchangers (51, 52) in the bypass humidity control is less than the amount of the outside air (OA) that passes through the adsorption heat exchangers (51, 52) in the normal humidity control.

Consequently, switching from the normal humidity control to the bypass humidity control makes it possible to reduce the amount of the outside air (OA) that passes through the adsorption heat exchangers (51, 52), thereby shifting the adjustable range of the humidity control capacity of the humidity control device (10) to the negative side (lower side). Conversely, switching from the bypass humidity control to the normal humidity control makes it possible to increase the amount of the outside air (OA) that passes through the adsorption heat exchangers (51, 52), thereby shifting the adjustable range of the humidity control capacity of the humidity control device (10) to the positive side (higher side).

Advantages of Second Embodiment

As described above, switching between the normal humidity control and the bypass humidity control makes it possible to shift the adjustable range of the humidity control capacity of the humidity control device (10). More specifically, switching the normal humidity control to the bypass humidity control if the target operating capacity (Ctg) of the compressor (53) falls below the lower limit operating capacity (CL) in the normal humidity control makes it possible to shift the adjustable range of the humidity control capacity of the humidity control device (10) to the negative side in a situation where there is no allowance to adjust the humidity control capacity of the humidity control device (10) to the negative side. Further, switching the bypass humidity control to the normal humidity control if the target operating capacity (Ctg) of the compressor (53) exceeds the upper limit operating capacity (CH) in the bypass humidity control makes it possible to shift the adjustable range of the humidity control capacity of the humidity control device (10) to the positive side in a situation where there is no allowance to adjust the humidity control capacity of the humidity control device (10) to the positive side.

In this manner, the switching between the normal humidity control and the bypass humidity control can shift the adjustable range of the humidity control capacity of the humidity control device (10), and thus, it is possible to further broaden the adjustment width (width of adjustable range) of the humidity control capacity of the humidity control device (10) than the case where only the normal humidity control is performed.

Moreover, if the lower limit operating capacity (CL) and the upper limit operating capacity (CH) are set such that the first humidity control capacity (humidity control capacity of the humidity control device (10) corresponding to the operating capacity of the compressor (53) being the lower limit operating capacity (CL) in the normal humidity control) is lower than the second humidity control capacity (humidity control capacity of the humidity control device (10) corresponding to the operating capacity of the compressor (53) being the upper limit operating capacity (CH) in the bypass humidity control), it is possible to avoid the bypass humidity control, which has just been switched from the normal humidity control, from returning to the normal humidity control due to the operating capacity of the compressor (53) exceeding the upper limit operating capacity (CH). Further, it is also possible to avoid the normal humidity control which has just been switched from the bypass humidity control, from returning to the bypass humidity control due to the operating capacity of the compressor (53) falling below the lower limit operating capacity (CL). This can reduce the possibility of frequent switching between the normal humidity control and the bypass humidity control (i.e., hunting).

Modification of Second Embodiment

Just like the modification of the first embodiment, in the humidity control device (10) of the second embodiment, the controller (95) may also control the refrigerant circuit (50) and the flow path switching mechanism (40) so as to finish the bypass humidity control (for example, so as to switch from the bypass humidity control to the normal humidity control), when a predetermined anti-condensation condition is satisfied while the bypass humidity control (second humidity control operation) is performed. Just like the modification of the first embodiment, the anti-condensation condition described above is a predetermined condition for preventing condensation in at least one of the first and second humidity control chambers (37, 38) and the first bypass passage (81).

Through the above-described control, it is possible to finish the bypass humidity control when the anti-condensation condition is satisfied in the bypass humidity control. This can prevent the condensation in at least one of the first and second humidity control chambers (37, 38) and the first bypass passage (81).

OTHER EMBODIMENTS

In the first embodiment described above, it has been described that the flow path switching mechanism (40) is configured such that, in the bypass humidity control (second humidity control operation), a portion of the outside air (OA) taken into the casing (11) is always supplied into the room through the first bypass passage (81), and a portion of the room air (RA) taken into the casing (11) is always exhausted to the outside through the second bypass passage (82). However, the flow path switching mechanism (40) may also be configured as follows. Specifically, the flow path switching mechanism (40) may also be configured to be able to alternately switch between a first bypass state and a second bypass state. In the first bypass state, a portion of the outside air (OA) taken into the casing (11) is supplied into the room through the first bypass passage (81), while a portion of the room air (RA) taken into the casing (11) is exhausted to the outside through the second bypass passage (82). In the second bypass state, a portion of the outside air (OA) taken into the casing (11) is supplied into the room through the second bypass passage (82), while a portion of the room air (RA) taken into the casing (11) is exhausted to the outside through the first bypass passage (81). Even if the flow path switching mechanism (40) is configured in this manner, in the bypass humidity control (second humidity control operation), the outside air (OA) taken into the casing (11) is supplied into the room through one of the first and second adsorption heat exchangers (51, 52) and one of the first and second bypass passages (81, 82), and the room air (RA) taken into the casing (11) is exhausted to the outside through the other of the first and second adsorption heat exchangers (51, 52), and the other of the first and second bypass passages (81, 82).

The embodiments described above can be combined with one another as appropriate. The embodiments described above are merely exemplary ones in nature, and do not intend to limit the scope of the present invention or applications or use thereof.

INDUSTRIAL APPLICABILITY

As can be seen, the above-described humidity control device is useful as a humidity control device for controlling humidity in a room.

DESCRIPTION OF REFERENCE CHARACTERS

10 Humidity Control Device
11 Casing
37 First Humidity Control Chamber
38 Second Humidity Control Chamber
40 Flow Path Switching Mechanism
50 Refrigerant Circuit
51 First Adsorption Heat Exchanger
52 Second Adsorption Heat Exchanger
53 Compressor
80 Bypass Passage
81 First Bypass Passage
82 Second bypass passage
95 Controller (Controlling Unit)

The invention claimed is:

1. A humidity control device, comprising:
a casing provided with a first humidity control chamber, a second humidity control chamber, and a bypass passage;
a refrigerant circuit including a compressor, and a first adsorption heat exchanger and a second adsorption heat exchanger which are respectively provided in the first and second humidity control chambers, the refrigerant circuit being capable of switching each of the first and second adsorption heat exchangers to a condenser or an evaporator;
a flow path switching mechanism comprising a plurality of dampers which switches an air flow passage in the casing; and
a controller which controls the refrigerant circuit and the plurality of dampers of the flow path switching mechanism so as to perform a first humidity control operation or a second humidity control operation, wherein
in the first humidity control operation, the bypass passage is closed, the compressor is set to be driven, and outside air taken into the casing is supplied into a room through one of the first and second adsorption heat exchangers, and room air taken into the casing is exhausted to outside through the other of the first and second adsorption heat exchangers;
in the second humidity control operation, the bypass passage is opened, the compressor is set to be driven, and the outside air taken into the casing is supplied into the room through the bypass passage and only one of the first and second adsorption heat exchangers, and the room air taken into the casing is exhausted to the outside through the other of the first and second adsorption heat exchangers; and
if a target operating capacity of the compressor falls below a predetermined lower limit operating capacity while the first humidity control operation is performed, the controller controls the refrigerant circuit and the plurality of dampers of the flow path switching mechanism to switch from the first humidity control operation to the second humidity control operation,
the refrigerant circuit performs a first refrigeration cycle operation in which the first adsorption heat exchanger functions as the condenser and the second adsorption heat exchanger functions as the evaporator, and a second refrigeration cycle operation in which the first adsorption heat exchanger functions as the evaporator and the second adsorption heat exchanger functions as the condenser,
the plurality of dampers of the flow path switching mechanism set the air flow passage in the casing to any one of a first path, a second path, a third path, or a fourth path,
in the first path, outdoor air taken into the casing is supplied into the room through the first adsorption heat exchanger, and room air taken into the casing is exhausted to the outside through the second adsorption heat exchanger,
in the second path, outdoor air taken into the casing is supplied into the room through the second adsorption heat exchanger, and room air taken into the casing is exhausted to the outside through the first adsorption heat exchanger,
in the third path, outdoor air taken into the casing is supplied into the room through the first adsorption heat exchanger and the bypass passage, and room air taken into the casing is exhausted to the outside through the second adsorption heat exchanger,
in the fourth path, outdoor air taken into the casing is supplied into the room through the second adsorption heat exchanger and the bypass passage, and room air taken into the casing is exhausted to the outside through the first adsorption heat exchanger,
in the first humidity control operation, a first operation and a second operation are alternately performed,
in the second humidity control operation, a third operation and a fourth operation are alternately performed,
in the first operation, the air flow passage in the casing is set to the first path, and one of the first refrigeration cycle operation and the second refrigeration cycle operation is performed in the refrigerant circuit,
in the second operation, the air flow passage in the casing is set to the second path, and the other of the first refrigeration cycle operation and the second refrigeration cycle operation is performed in the refrigerant circuit,
in the third operation, the air flow passage in the casing is set to the third path, and one of the first refrigeration cycle operation and the second refrigeration cycle is performed in the refrigerant circuit, and
in the fourth operation, the air flow passage in the casing is set to the fourth path, and the other of the first refrigeration cycle operation and the second refrigeration cycle operation is performed in the refrigerant circuit.

2. The humidity control device of claim 1, wherein
if the target operating capacity of the compressor exceeds a predetermined upper limit operating capacity while the second humidity control operation is performed, the controller controls the refrigerant circuit and the plurality of dampers of the flow path switching mechanism to switch from the second humidity control operation to the first humidity control operation.

3. The humidity control device of claim 1, wherein
if the target operating capacity of the compressor exceeds a predetermined upper limit operating capacity while the second humidity control operation is performed, the controller controls the refrigerant circuit and the plurality of dampers of the flow path switching mechanism to switch from the second humidity control operation to the first humidity control operation, and the lower limit operating capacity and the upper limit operating capacity are set so that a first humidity control capacity corresponding to an operating capacity of the compressor being the lower limit operating capacity in the first humidity control operation is lower than a second humidity control capacity corresponding to an operating capacity of the compressor being the upper limit operating capacity.

4. The humidity control device of claim 1, wherein
if a predetermined anti-condensation condition for preventing condensation in at least one of the first and second humidity control chambers and the bypass passage is satisfied while the second humidity control operation is performed, the controller controls the refrigerant circuit and the plurality of dampers of the flow path switching mechanism so that the second humidity control operation is finished.

5. A humidity control device, comprising:
a casing provided with a first humidity control chamber, a second humidity control chamber, and a bypass passage;
a refrigerant circuit including a compressor, and a first adsorption heat exchanger and a second adsorption heat exchanger which are respectively provided in the first and second humidity control chambers, the refrigerant circuit being capable of switching each of the first and second adsorption heat exchangers to a condenser or an evaporator;
a flow path switching mechanism comprising a plurality of dampers which switches an air flow passage in the casing; and
a controller which controls the refrigerant circuit and the plurality of dampers of the flow path switching mechanism so as to perform a first humidity control operation or a second humidity control operation, wherein
the bypass passage includes a first bypass passage and a second bypass passage,
in the first humidity control operation, the first and second bypass passages are closed, the compressor is set to be driven, and outside air taken into the casing is supplied into a room through one of the first and second adsorption heat exchangers, and room air taken into the casing is exhausted to outside through the other of the first and second adsorption heat exchangers;
in the second humidity control operation, the first and second bypass passages are opened, the compressor is set to be driven, and the outside air taken into the casing is supplied into the room through only one of the first and second bypass passages and only one of the first and second adsorption heat exchangers, and the room air taken into the casing is exhausted to the outside through the other of the first and second bypass passages and the other of the first and second adsorption heat exchangers; and if a target operating capacity of the compressor falls below a predetermined lower limit operating capacity while the first humidity control operation is performed, the controller controls the refrigerant circuit and the plurality of dampers of the flow path switching mechanism to switch from the first humidity control operation to the second humidity control operation, the refrigerant circuit performs a first refrigeration cycle operation in which the first adsorption heat exchanger functions as the condenser and the second adsorption heat exchanger functions as the evaporator, and a second refrigeration cycle operation in which the first adsorption heat exchanger functions as the evaporator and the second adsorption heat exchanger functions as the condenser, the plurality of dampers of the flow path switching mechanism set the air flow passage in the casing to any one of a first path, a second path, a third path, or a fourth path, in the first path, outdoor air taken into the casing is supplied into the room through the first adsorption heat exchanger, and room air taken into the casing is exhausted to the outside through the second adsorption heat exchanger, in the second path, outdoor air taken into the casing is supplied into the room through the second adsorption heat exchanger, and room air taken into the casing is exhausted to the outside through the first adsorption heat exchanger, in the third path, outdoor air taken into the casing is supplied into the room through the first adsorption heat exchanger and the bypass passage, and room air taken into the casing is exhausted to the outside through the second adsorption heat exchanger, in the fourth path, outdoor air taken into the casing is supplied into the room through the second adsorption heat exchanger and the bypass passage, and room air taken into the casing is exhausted to the outside through the first adsorption heat exchanger, in the first humidity control operation, a first operation and a second operation are alternately performed, in the second humidity control operation, a third operation and a fourth operation are alternately performed, in the first operation, the air flow passage in the casing is set to the first path, and one of the first refrigeration cycle operation and the second refrigeration cycle operation is performed in the refrigerant circuit, in the second operation, the air flow passage in the casing is set to the second path, and the other of the first refrigeration cycle operation and the second refrigeration cycle operation is performed in the refrigerant circuit, in the third operation, the air flow passage in the casing is set to the third path, and one of the first refrigeration cycle operation and the second refrigeration cycle operation is performed in the refrigerant circuit, and in the fourth operation, the air flow passage in the casing is set to the fourth path, and the other of the first refrigeration cycle operation and the second refrigeration cycle operation is performed in the refrigerant circuit.

* * * * *